United States Patent
Tojo et al.

(10) Patent No.: US 10,781,309 B2
(45) Date of Patent: Sep. 22, 2020

(54) THERMOPLASTIC POLYESTER RESIN COMPOSITION AND MOLDED ARTICLE

(71) Applicant: Toray Industries, Inc., Tokyo (JP)

(72) Inventors: Yusuke Tojo, Nagoya (JP); Makito Yokoe, Nagoya (JP); Hideyuki Umetsu, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 16/074,482

(22) PCT Filed: Jan. 19, 2017

(86) PCT No.: PCT/JP2017/001776
§ 371 (c)(1),
(2) Date: Aug. 1, 2018

(87) PCT Pub. No.: WO2017/135055
PCT Pub. Date: Aug. 10, 2017

(65) Prior Publication Data
US 2019/0055398 A1 Feb. 21, 2019

(30) Foreign Application Priority Data

| Feb. 2, 2016 | (JP) | 2016-017712 |
| Jul. 13, 2016 | (JP) | 2016-138312 |
| Aug. 31, 2016 | (JP) | 2016-169142 |
| Aug. 31, 2016 | (JP) | 2016-169143 |

(51) Int. Cl.
| C08L 67/02 | (2006.01) |
| C08L 63/04 | (2006.01) |
| C08K 5/49 | (2006.01) |
| C08L 63/00 | (2006.01) |
| B29B 9/06 | (2006.01) |
| B29K 67/00 | (2006.01) |
| B29K 105/00 | (2006.01) |

(52) U.S. Cl.
CPC ............... C08L 67/02 (2013.01); C08K 5/49 (2013.01); C08L 63/00 (2013.01); C08L 63/04 (2013.01); *B29B 9/065* (2013.01); *B29K 2067/006* (2013.01); *B29K 2105/0044* (2013.01); *C08L 2201/08* (2013.01)

(58) Field of Classification Search
CPC ... C08L 67/00–03; C08L 63/04; C08K 5/524; C08K 5/32
See application file for complete search history.

(56) References Cited

U.S. PATENT DOCUMENTS

| 2004/0122171 A1* | 6/2004 | Garrison | C08G 59/226 525/107 |
| 2007/0020422 A1* | 1/2007 | Rule | C08K 5/0091 428/36.92 |
| 2011/0160364 A1* | 6/2011 | Toyohara | C08L 67/02 524/117 |
| 2013/0324646 A1* | 12/2013 | De Campo | C01B 25/165 524/101 |
| 2016/0289445 A1* | 10/2016 | Tojo | C08L 63/00 |

FOREIGN PATENT DOCUMENTS

| EP | 0984027 A1 * | 3/2000 | C08G 63/916 |
| EP | 3072928 A1 | 9/2016 | |
| JP | 62-022822 A | 1/1987 | |
| JP | 07-165878 A | 6/1995 | |
| JP | 08-225720 A | 9/1996 | |
| JP | 08-245862 A | 9/1996 | |
| JP | 08-245865 A | 9/1996 | |
| JP | H10-212398 | 8/1998 | |
| JP | 3387799 B2 | 3/2003 | |
| JP | 2009-155475 A | 7/2009 | |
| JP | 2010-6937 | 1/2010 | |
| JP | 2012-241179 A | 12/2012 | |
| JP | 2014-196484 A | 10/2014 | |
| JP | 2015123715 A * | 7/2015 | |
| JP | 2016017104 A * | 2/2016 | |
| WO | 98/44019 A1 | 10/1998 | |
| WO | WO-2015072216 A1 * | 5/2015 | C08L 67/02 |

OTHER PUBLICATIONS

Neale, M. J. Lubrication and Reliability Handbook. Butterworth-Heinemann. 2001. pp. A4.1 to A4.4. (Year: 2001).*
Extended European Search Report dated Aug. 22, 2019, of counterpart European Application No. 17747214.9.
European Communication dated Sep. 10, 2019, of counterpart European Application No. 17747214.9.

* cited by examiner

*Primary Examiner* — Stephen E Rieth
(74) *Attorney, Agent, or Firm* — DLA Piper LLP (US)

(57) ABSTRACT

A thermoplastic polyester resin composition is obtained by blending, per 100 parts by weight of (A) a thermoplastic polyester resin, 0.1 to 5 parts by weight of (B) a novolac type epoxy resin having a specific structure, and 0.05 to 10 parts by weight of (C) an epoxy compound having two epoxy functional groups per molecule. Thus, a molded article that exhibits superior melt stability with respect to a wide range of processing temperatures, has excellent mechanical properties and heat resistance, and exhibits superior long-term hydrolysis resistance, chemical resistance, and oxidative deterioration resistance can be obtained.

8 Claims, No Drawings

THERMOPLASTIC POLYESTER RESIN COMPOSITION AND MOLDED ARTICLE

TECHNICAL FIELD

This disclosure relates to thermoplastic polyester resin compositions and molded articles obtained by molding the same.

BACKGROUND

Thermoplastic polyester resins have various characteristics such as excellent injection moldability and mechanical properties and are used in a wide range of fields such as mechanical machine parts, electrical and electronic components, and automotive parts with good use of the characteristics. However, thermoplastic polyester resins are subject to degradation by hydrolysis and, thus, to be used as industrial materials such as materials for mechanical machine parts, electric and electronic components, and automotive parts, the resins are required to have long-term hydrolysis resistance in addition to having balanced chemical and physical properties in general. There is recently a growing demand for thinning and weight-reducing as well as downsizing of molded articles. In particular, in applications for thin-walled molded articles such as connectors, a large viscosity change during melt residence will cause molding failure such as flashes and short shots in molding so that there is a demand for materials having excellent melt stability that cause a smaller viscosity change during melt residence.

As a method of imparting hydrolysis resistance to thermoplastic polyester resins, a method in which to blend an epoxy resin with a thermoplastic polyester resin is known. As such a resin composition, hitherto proposed are a thermoplastic resin composition obtained by blending a compound having three or more functional groups and two or more reactive end blocking agents with a thermoplastic polyester resin (see JP 2009-155478 A) and a polybutylene terephthalate resin composition obtained by blending a copolymer containing a glycidyl group, an ethylene. α-olefin copolymer, a fibrous reinforcing filler, and an epoxy compound with a polybutylene terephthalate resin (JP 2014-196484 A), but there is a problem in that those techniques still cause insufficient hydrolysis resistance.

In addition, as a resin composition containing two kinds of epoxy compounds that have a different number of epoxy functional groups per molecule, proposed is a polyester resin obtained by melt kneading a mixture including a straight-chain saturated polyester resin composition, a compound containing two epoxy groups in the molecule, a compound containing three or more epoxy groups in the molecule, and a binding reactivity catalyst (see WO 98/44019). However, these are directed to the object of improving molding-processability, and there remains drawbacks in that the resin composition described in WO '019 has insufficient hydrolysis resistance and melt stability.

It could therefore be helpful to provide a thermoplastic polyester resin composition having excellent melt stability in a wide range of processing temperature, excellent mechanical properties and heat resistance, and further is capable of affording a molded article having excellent long-term hydrolysis resistance and chemical resistance and having excellent oxidative degradation resistance; and the molded article thereof.

SUMMARY

We discovered that by blending (B) a novolac type epoxy resin having a specific structure and (C) an epoxy compound in which the number of epoxy functional groups per molecule is two each in a specific amount with (A) a thermoplastic polyester resin. We thus provide:

[1] The thermoplastic polyester resin composition containing (A) 100 parts by weight of a thermoplastic polyester resin, (B) 0.05 to 5 parts by weight of a novolac type epoxy resin represented by the below-mentioned general formula (1), and (C) 0.05 to 10 parts by weight of an epoxy compound in which number of epoxy functional groups per molecule is two.

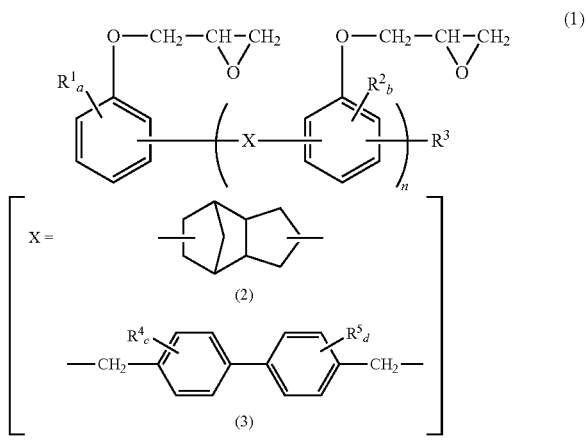

wherein, in the general formula (1), X represents a bivalent group represented by the general formula (2) or (3); in the general formulae (1) and (3), $R^1$, $R^2$, $R^4$, and $R^5$ independently represent $C_1$-$C_8$ alkyl, or $C_6$-$C_{10}$ aryl and may be the same or different; $R^3$ represents a hydrogen atom, $C_1$-$C_8$ alkyl or $C_6$-$C_{10}$ aryl; in the general formula (1), n represents a value greater than 0 and equal to or smaller than 10; and, in the general formulae (1) and (3), a, c, and d independently represent an integer from 0 to 4, and b represents an integer from 0 to 3.

[2] The thermoplastic polyester resin composition according to [1], wherein a concentration of epoxy group is 30 to 150 eq/t.

[3] The thermoplastic polyester resin composition according to [1] or [2], wherein a concentration of carboxyl group is 0 to 20 eq/t.

[4] The thermoplastic polyester resin composition according to any of [1] to [3], wherein the compounded amount ratio of (C) the epoxy compound in which the number of epoxy functional groups per molecule is two to (B) the novolac type epoxy resin represented by the general formula (1) is 0.5 to 4.

[5] The thermoplastic polyester resin composition according to any of [1] to [4], wherein (C) the epoxy compound in which the number of epoxy functional groups per molecule is two is a bisphenol-A type epoxy resin.

[6] The thermoplastic polyester resin composition according to any of [1] to [5], wherein (C) the epoxy compound in which the number of epoxy functional groups per molecule is two is a bisphenol-A type epoxy resin having an epoxy value of 300 to 3000 g/eq.

[7] The thermoplastic polyester resin composition according to any of [1] to [6], further containing (D) 0.01 to 1 part by weight of a reducing phosphorus compound represented by the below-mentioned general formula (4), relative to (A) 100 parts by weight of the thermoplastic polyester resin.

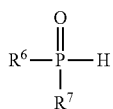

(4)

wherein, in the general formula (4), $R^6$ and $R^7$ are independently selected from hydrogen (but there is no case where both $R^6$ and $R^7$ are hydrogen), OM (wherein O is a negatively-charged oxygen atom and M is a positively-charged counterion), $C_1$-$C_{20}$ alkyl, $C_2$-$C_{20}$ alkylene, $C_6$-$C_{20}$ aryl, $C_1$-$C_{20}$ alkyloxy, polyoxyalkylene including $C_2$-$C_4$ alkylene, and $C_6$-$C_{20}$ aryloxy; the alkyl, alkylene, aryl, alkyloxy, polyoxyalkylene, and aryloxy may be optionally substituted, and the optional substituents are independently selected from OH group, halogen, COOH group, $COOR^8$ group (wherein $R^8$ is $C_1$-$C_4$ alkyl) and $NH_2$ group; wherein in cases where the alkyl, alkylene, aryl, alkyloxy, polyoxyalkylene, and aryloxy are substituted, the number of substituents is 1 or 2; and $R^6$ and $R^7$ can be linked by cross-linking.

[8] The thermoplastic polyester resin composition according to [7], wherein (D) the reducing phosphorus compound represented by the general formula (4) is a metal phosphite or a metal hypophosphite.

[9] The thermoplastic polyester resin composition according to any of [1] to [8], wherein (A) the thermoplastic polyester resin is polybutylene terephthalate.

[10] The thermoplastic polyester resin composition according to any of [1] to [9], further containing (E) 0.01 to 1 part by weight of a phosphoric stabilizer with respect to (A) 100 parts by weight of the thermoplastic polyester resin.

[11] The thermoplastic polyester resin composition according to any of [1] to [10], further containing (F) 1 to 100 parts by weight of a fibrous reinforcing filler with respect to (A) 100 parts by weight of the thermoplastic polyester resin.

[12] The thermoplastic polyester resin composition according to any of [1] to [11], further containing (G) 0.001 to 1 part by weight of a reaction accelerator with respect to (A) 100 parts by weight of the thermoplastic polyester resin.

[13] A molded article melt-molded from the thermoplastic polyester resin composition according to any of [1] to [12].

The thermoplastic polyester resin composition has excellent melt stability in a wide range of processing temperatures. The thermoplastic polyester resin composition is capable of affording a molded article having excellent mechanical properties and heat resistance, further having long-term hydrolysis resistance and chemical resistance, and having excellent oxidative degradation resistance.

DETAILED DESCRIPTION

Next, the thermoplastic polyester resin composition will be described in detail.

The thermoplastic polyester resin composition contains (A) 100 parts by weight of a thermoplastic polyester resin, (B) 0.05 to 5 parts by weight of a novolac type epoxy resin represented by general formula (1), and (C) 0.05 to 10 parts by weight of an epoxy compound in which the number of epoxy functional groups per molecule is two. (A) the thermoplastic polyester resin has excellent injection moldability and mechanical properties, but is subject to the decomposition of the ester bond by hydrolysis, resulting in an increased concentration of carboxyl end group. The increased concentration of carboxyl end group is accompanied by an accelerated reduction of the molecular weight of (A) the thermoplastic polyester resin, whose mechanical properties then become degraded. Blending (B) the novolac type epoxy resin represented by general formula (1) together with (A) the thermoplastic polyester resin allows the reaction between the carboxyl end groups generated from (A) the thermoplastic polyester resin by hydrolysis and the epoxy groups of (B) the novolac type epoxy resin represented by general formula (1), thereby suppressing an increase in the concentration of carboxyl end group. As a result, the high mechanical properties that (A) the thermoplastic polyester resin has can be maintained. However, containing (B) the novolac type epoxy resin represented by general formula (1) in which the number of epoxy groups per molecule is three or more allows a reaction between the end groups of (A) the thermoplastic polyester resin and the epoxy groups of (B) the novolac type epoxy resin represented by general formula (1) at a high melt processing temperature of 270° C. or more, and simultaneously cross-links the molecular chains. The cross-link involves a network structure arising from the reaction between the carboxyl end groups of (A) the thermoplastic polyester resin and the epoxy groups of (B) the component in which the number of epoxy groups per molecule is three or more. As a result, the resin composition will have lower melt stability and restricted melt processing temperature in some cases. The restricted melt processing temperature in molding will cause short shots in using a thermoplastic polyester resin composition to process molded articles having thin-walled parts, and hence is not desirable. Accordingly, further blending (C) an epoxy compound in which the number of epoxy functional groups per molecule is two and thereby discouraging the formation of a cross-linking structure leading to lower melt stability can suppress the lowering of melt stability at high temperature while further improving hydrolysis resistance.

In this regard, there exists a situation under which it is not practical to identify the structure of the reactant that is included in the thermoplastic polyester resin composition and that results from the reaction of (A) the component, (B) the component, and (C) the component, because the reactant is produced through complicated reaction. Accordingly, the components are blended.

(A) The thermoplastic polyester resin is a polymer or a copolymer containing, as major structural units, at least one type of residue selected from the group consisting of (1) a dicarboxylic acid or an ester-forming derivative thereof and a diol or an ester-forming derivative thereof, (2) a hydroxycarboxylic acid or an ester-forming derivative thereof, and (3) a lactone. As used herein, the expression "containing as major structural units" means that the resin contains at least one type of residue selected from the group consisting of (1) to (3) in an amount of 50% by mole or more in all structural units, and in a preferred aspect, the resin contains the residue(s) in an amount of 80% by mole or more. Among these, a polymer or a copolymer which has residues of (1) a dicarboxylic acid or an ester-forming derivative thereof and a diol or an ester-forming derivative thereof as major structural units is preferred in terms of improving mechanical properties and heat resistance.

Examples of the dicarboxylic acid or ester-forming derivative thereof include: aromatic dicarboxylic acids such as terephthalic acid, isophthalic acid, phthalic acid, 2,6- naphthalene dicarboxylic acid, 1,5-naphthalene dicarboxylic acid, bis(p-carboxyphenyl)methane, anthracene dicarboxylic acid, 4,4'-diphenyl ether dicarboxylic acid, 5-tetrabutylphosphonium isophthalic acid, and 5-sodium sulfoisophthalic acid; aliphatic dicarboxylic acids such as oxalic acid, succinic acid, adipic acid, sebacic acid, azelaic acid, dodecanedioic acid, malonic acid, glutaric acid, and dimer acid; alicyclic dicarboxylic acids such as 1,3-cyclohexanedicarboxylic acid, and 1,4-cyclohexanedicarboxylic acid; and ester-forming derivatives thereof; and the like. Two or more of these may be used.

In addition, examples of the diols or ester-forming derivatives include: $C_2$-$C_{20}$ aliphatic or alicyclic glycols such as ethylene glycol, propylene glycol, 1,4-butanediol, neopentyl glycol, 1,5-pentanediol, 1,6-hexanediol, decamethylene glycol, cyclohexane dimethanol, cyclohexanediol, and dimerdiol; long chain glycols having a molecular weight of 200 to 100,000 such as polyethylene glycol, poly-1,3-propylene glycol, and polytetramethylene glycol; aromatic dioxy compounds such as 4,4'-dihydroxybiphenyl, hydroquinone, t-butylhydroquinone, bisphenol-A, bisphenol-S, and bisphenol-F; ester-forming derivatives thereof; and the like. Two or more of these may be used.

Examples of polymers or copolymers containing as structural units a dicarboxylic acid or an ester-forming derivative thereof and a diol or an ester-forming derivative thereof include aromatic polyester resins such as polyethylene terephthalate, polypropylene terephthalate, polybutylene terephthalate, polypropylene isophthalate, polybutylene isophthalate, polybutylene naphthalate, polypropylene isophthalate/terephthalate, polybutylene isophthalate/terephthalate, polypropylene terephthalate/naphthalate, polybutylene terephthalate/naphthalate, polybutylene terephthalate/decanedicarboxylate, polypropylene terephthalate/5-sodium sulfoisophthalate, polybutylene terephthalate/5-sodium sulfoisophthalate, polypropylene terephthalate/polyethylene glycol, polybutylene terephthalate/polyethylene glycol, polypropylene terephthalate/polytetramethylene glycol, polybutylene terephthalate/polytetramethylene glycol, polypropylene terephthalate/isophthalate/polytetramethylene glycol, polybutylene terephthalate/isophthalate/polytetramethylene glycol, polybutylene terephthalate/succinate, polypropylene terephthalate/adipate, polybutylene terephthalate/adipate, polypropylene terephthalate/sebacate, polybutylene terephthalate/sebacate, polypropylene terephthalate/isophthalate/adipate, polybutylene terephthalate/isophthalate/succinate, polybutylene terephthalate/isophthalate/adipate, polybutylene terephthalate/isophthalate/sebacate, and the like. "/" represents a copolymer.

Among these, a polymer or a copolymer which has residues of an aromatic dicarboxylic acid or an ester-forming derivative thereof and an aliphatic diol or an ester-forming derivative thereof as major structural units is preferred in terms of further improving mechanical properties and heat resistance, and a polymer or a copolymer which has residues of terephthalic acid, naphthalenedicarboxylic acid or an ester-forming derivative thereof and an aliphatic diol selected from propylene glycol and 1,4-butanediol or an ester-forming derivative thereof as major structural units is more preferred.

Among these, particularly preferred are aromatic polyester resins such as polyethylene terephthalate, polypropylene terephthalate, polybutylene terephthalate, polypropylene naphthalate, polybutylene naphthalate, polypropylene isophthalate/terephthalate, polybutylene isophthalate/terephthalate, polypropylene terephthalate/naphthalate and polybutylene terephthalate/naphthalate. More preferred are polybutylene terephthalate, polypropylene terephthalate, and polybutylene naphthalate. Still more preferred is polybutylene terephthalate in terms of improving moldability and crystallinity. Two or more of these compounds may be used at an arbitrary content.

The ratio of the amount of terephthalic acid or ester-forming derivative thereof with respect to the total amount of the dicarboxylic acids constituting the polymer or the copolymer that has residues of a dicarboxylic acid or an ester-forming derivative thereof and a diol or an ester-forming derivative thereof as major structural units is preferably 30% by mole or more, and more preferably, 40% by mole or more.

As (A) the thermoplastic polyester resin, a liquid crystal polyester resin capable of developing anisotropy during melting can be used. Examples of the structural unit of the liquid crystal polyester resin include: aromatic oxycarbonyl units, aromatic dioxy units, aromatic and/or aliphatic dicarbonyl units, alkylenedioxy units, aromatic iminooxy units, and the like.

The content of the carboxyl end groups of (A) the thermoplastic polyester resin is preferably 50 eq/t or less, more preferably 30 eq/t or less, in terms of flowability, hydrolysis resistance, and heat resistance. The lower limit of the content of the carboxyl end groups is about 0 eq/t. The content of the carboxyl end groups of (A) the thermoplastic polyester resin is a value measured by dissolving (A) the thermoplastic polyester resin in an o-cresol/chloroform solvent and then titrating the solution with ethanolic potassium hydroxide.

(A) The thermoplastic polyester resin preferably has a weight average molecular weight (Mw) of 8,000 or more in terms of further improving the mechanical properties. The weight average molecular weight (Mw) being 500,000 or less can improve the flowability and the molecular weight is more preferably 300,000 or less, still more preferably 250,000 or less. The Mw of (A) the thermoplastic polyester resin is a value in terms of polymethyl methacrylate (PMMA), as determined by gel permeation chromatography (GPC) using hexafluoroisopropanol as a solvent.

(A) The thermoplastic polyester resin can be produced by a known method such as polycondensation or ring-opening polymerization. The production method may be by either batch polymerization or continuous polymerization, and can be by the application of either transesterification or direct polymerization reaction, and in terms of productivity, continuous polymerization is preferred, and direct polymerization is more preferred.

When (A) the thermoplastic polyester resin is a polymer or a copolymer that contains as main components a dicarboxylic acid or an ester-forming derivative thereof and a diol or an ester-forming derivative thereof and that is obtained by condensation reaction, the polyester resin can be produced by subjecting the dicarboxylic acid or ester forming derivative thereof and the diol or ester-forming derivative thereof to an esterification reaction or transesterification reaction, followed by a polycondensation reaction.

To effectively promote esterification reaction or transesterification reaction and polycondensation reaction, a polymerization reaction catalyst is preferably added during these reactions. Specific examples of the polymerization catalyst include: organic titanium compounds such as methyl ester, tetra-n-propyl ester, tetra-n-butyl ester, tetraisopropyl ester, tetraisobutyl ester, tetra-tert-butyl ester, cyclohexyl ester, phenyl ester, benzyl ester, and tolyl ester of titanic acid, and mixed esters thereof; tin compounds such as dibutyltin oxide, methylphenyltin oxide, tetraethyltin, hexaethylditin oxide, cyclohexahexylditin oxide, didodecyltin oxide, triethyltin hydroxide, triphenyltin hydroxide, triisobutyltin acetate, dibutyltin diacetate, diphenyltin dilaurate, monobutyltin trichloride, dibutyltin dichloride, tributyltin chloride, dibutyltin sulfide, butylhydroxytin oxide, and alkylstannonic acids such as methylstannonic acid, ethylstannonic acid, and butylstannonic acid; zirconia compounds such as zirconium tetra-n-butoxide; and antimony compounds such as antimony trioxide and antimony acetate; and the like. Two or more of these may be used.

Among the above-mentioned polymerization reaction catalysts, organic titanium compounds and tin compounds are preferred, and the tetra-n-butyl ester of titanic acid is more preferred. The adding amount of the polymerization reaction catalyst is preferably from 0.01 to 0.2 parts by weight with respect to 100 parts by weight of the thermoplastic polyester resin.

The thermoplastic polyester resin composition is characterized by containing (A) the thermoplastic polyester resin and (B) the novolac type epoxy resin represented by general formula (1). As above-mentioned, thermoplastic polyester resins are subject to degradation by hydrolysis but can have hydrolysis resistance improved by containing (B) the novolac type epoxy resin represented by general formula (1). In addition, selecting a novolac type epoxy resin having the above-mentioned specific structure allows the resin to maintain melt stability. Two or more of these may be included.

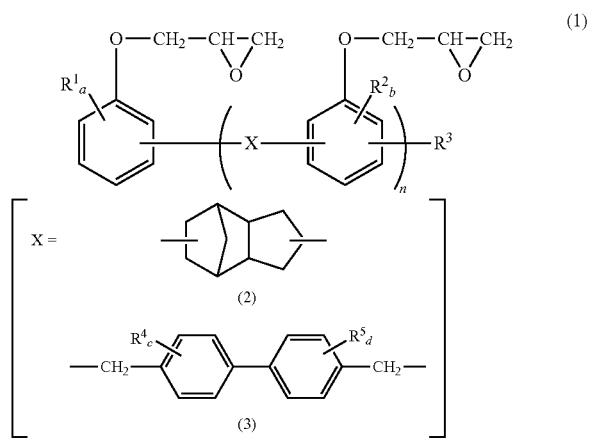

wherein, in general formula (1), X represents a bivalent group represented by the general formula (2) or (3); in the general formulae (1) and (3), $R^1$, $R^2$, $R^4$, and $R^5$ independently represent $C_1$-$C_8$ alkyl or $C_6$-$C_{10}$ aryl and may be the same or different; $R^3$ represents a hydrogen atom, $C_1$-$C_8$ alkyl or $C_6$-$C_{10}$ aryl; in the general formula (1), n represents a value greater than 0 and equal to or smaller than 10; and, in the general formulae (1) and (3), a, c, and d independently represent an integer from 0 to 4, and b represents an integer from 0 to 3.

In terms of further improving long-term hydrolysis resistance, X in general formula (1) is preferably a bivalent group represented by general formula (2).

Examples of $C_1$-$C_8$ alkyl groups include a methyl group, an ethyl group, an n-propyl group, an isopropyl group, an n-butyl group, a sec-butyl group, a tert-butyl group and the like. Among these, a methyl group is preferable in terms of reactivity. Examples of $C_6$-$C_{10}$ aryl groups include a phenyl group, a methylphenyl group, a dimethylphenyl group, a naphthyl group, and the like. Among these, a phenyl group is preferable in terms of reactivity. In terms of reactivity, a, b, c, and d are preferably 0 or 1.

The compounded amount of (B) the novolac type epoxy resin represented by general formula (1) is from 0.05 to 5 parts by weight with respect to (A) 100 parts by weight of the thermoplastic polyester resin. Long-term hydrolysis resistance is reduced when the compounded amount of (B) the component is less than 0.05 parts by weight. On the other hand, when the compounded amount of (B) the component is more than 5 parts by weight, heat resistance is reduced, and melt stability is lowered.

The preferable range of the compounded amount of (B) the novolac type epoxy resin represented by general formula (1) can be determined in accordance with the epoxy equivalent of (B) the novolac type epoxy resin represented by general formula (1). For example, the ratio of the amount of epoxy group derived from (B) the novolac type epoxy resin represented by general formula (1) contained in the thermoplastic polyester resin composition to the amount of carboxyl end group derived from (A) the thermoplastic polyester resin contained in the thermoplastic polyester resin composition (the compounded amount of epoxy group (eq/g)/the compounded amount of carboxyl group (eq/g)) is preferably 1 to 7. When "(the compounded amount of epoxy group (eq/g)/the compounded amount of carboxyl group (eq/g))" is 1 or more, the long-term hydrolysis resistance can be further improved. It is preferably 2 or more. In addition, when "(the compounded amount of epoxy group (eq/g)/the compounded amount of carboxyl group (eq/g))" is 7 or less, melt stability, heat resistance, and mechanical properties can be achieved at a higher level at the same time. It is preferably 6 or less, more preferably 5 or less.

The amount of carboxyl end group derived from (A) the thermoplastic polyester resin contained in the thermoplastic polyester resin composition can be determined from the concentration of carboxyl end groups in (A) the component and the compounded ratio of (A) the component in the whole thermoplastic polyester resin composition. The concentration of carboxyl end groups of (A) the thermoplastic polyester resin can be calculated by dissolving (A) the thermoplastic polyester resin in a mixed solution of o-cresol/chloroform (2/1, vol/vol) and then titrating the resulting solution with 0.05 mol/L ethanolic potassium hydroxide, using 1% bromophenol blue as an indicator.

The thermoplastic polyester resin composition is characterized by containing (C) an epoxy compound in which the number of epoxy functional groups per molecule is two in addition to (A) the thermoplastic polyester resin. As above-mentioned, there are some instances in which the thermoplastic polyester resin composition containing (B) the novolac type epoxy resin represented by general formula (1) have melt stability lowered by the cross-linking of molecular chains at a melt processing temperature of 270° C. or more. However, blending (C) an epoxy compound in which the number of epoxy functional groups per molecule is two and thereby discouraging the formation of a cross-linking structure leading to lower melt stability can suppress the lowering of melt stability at high temperature while further improving hydrolysis resistance.

(C) The epoxy compound in which the number of epoxy functional groups per molecule is two is a compound containing 2 epoxy groups in the molecule and can be used in liquid or solid form. Examples of epoxy compounds include: glycidyl ether type epoxy compounds that are polycondensates of epichlorohydrin and a phenol compound such as bisphenol-A, resorcinol, hydroquinone, pyrocatechol, bisphenol-F, saligenin, bisphenol-S, 4,4'-dihydroxybiphenyl, 1,5-dihydroxy naphthalene, or cashew phenol; glycidyl ester epoxy compounds such as glycidyl phthalate; and glycidyl amine epoxy compounds such as N,N'-methylene bis(N-glycidyl aniline). Two or more of these may be included. Among these, glycidyl ether type epoxy compounds are preferable in that they can suppress decomposition during melt processing, and in addition, bisphenol-A type epoxy compounds that are polycondensates of bisphenol-A and epichlorohydrin are preferable in that chemical resistance, which is resistance to degradation due to contact with chemicals at high temperature, can be improved by improving the surface free energy of the resin composition and thus preventing the permeation of chemicals such as industrial lubricating oils and greases. (C) the component contains no novolac type epoxy compound.

Further, among bisphenol-A type epoxy compounds, bisphenol-A type epoxy resins having an epoxy value of 300 to 3000 g/eq are preferable. When the epoxy value of a bisphenol-A type epoxy resin is 300 g/eq or more, the amount of gas emission during melt processing can be suppressed. It is more preferably 500 g/eq or more. When the epoxy value of a bisphenol-A type epoxy resin is 3000 g/eq or less, the long-term hydrolysis resistance and the melt stability at high temperature can be achieved at a higher level at the same time. It is more preferably 2000 g/eq or less.

The compounded amount of (C) the epoxy compound in which the number of epoxy functional groups per molecule is two is 0.05 to 10 parts by weight with respect to (A) 100 parts by weight of the thermoplastic polyester resin. The compounded amount of (C) the epoxy compound in which the number of epoxy functional groups per molecule is two being less than 0.05 parts by weight does not afford the effect of improving heat aging resistance. The compounded amount is more preferably 0.5 parts by weight or more, still more preferably 1.0 part by weight or more. On the other hand, the compounded amount of (C) the epoxy compound in which the number of epoxy functional groups per molecule is two being more than 10 parts by weight tends to reduce the mechanical properties. The compounded amount is more preferably 5.0 parts by weight or less, still more preferably 3.0 parts by weight or less.

The preferable range of the compounded amount of (C) the epoxy compound in which the number of epoxy functional groups per molecule is two can be determined in accordance with the compounded amount of (B) the novolac type epoxy resin represented by general formula (1). For example, in producing the thermoplastic polyester resin composition, the ratio of the compounded amount of (C) the epoxy compound in which the number of epoxy functional groups per molecule is two to the compounded amount of (B) the novolac type epoxy resin represented by general formula (1) ((the parts by weight of (C) the epoxy compound in which the number of epoxy functional groups per molecule is two with respect to (A) 100 parts by weight of the thermoplastic polyester resin)/(the parts by weight of (B) the novolac type epoxy resin represented by general formula (1) with respect to (A) 100 parts by weight of the thermoplastic polyester resin)) is preferably 0.5 to 4. The compounded amount ratio of (C) the epoxy compound in which the number of epoxy functional groups per molecule is two to (B) the novolac type epoxy resin represented by general formula (1) being 0.5 or more can further improve the melt stability. It is preferably 1 or more. The compounded amount ratio of (C) the epoxy compound in which the number of epoxy functional groups per molecule is two to (B) the novolac type epoxy resin represented by general formula (1) being 4 or less can afford the long-term hydrolysis resistance, melt stability at high temperature, and mechanical properties at a higher level at the same time. It is preferably 3 or less, more preferably 2.5 or less.

It is important, as the first factor to impart hydrolysis resistance that cannot be achieved by conventional technologies, to blend (B) the novolac type epoxy resin represented by general formula (1) and (C) the epoxy compound in which the number of epoxy functional groups per molecule is two and allow them to react to thereby reduce the carboxyl end groups originally existing in (A) the thermoplastic polyester resin. From that viewpoint, the concentration of carboxyl groups in the thermoplastic polyester resin composition obtained by melt kneading, that is, the concentration of carboxyl groups derived from (A) the thermoplastic polyester resin, the concentration of carboxyl groups derived from the reactant of (A) the thermoplastic polyester resin and (B) the novolac type epoxy resin represented by general formula (1), and the concentration of carboxyl groups derived from the reactant of (A) the thermoplastic polyester resin and (C) the epoxy compound in which the number of epoxy functional groups per molecule is two, with respect to the total amount of (A) the thermoplastic polyester resin, the reactant of (A) the thermoplastic polyester resin and (B) the novolac type epoxy resin represented by general formula (1), and the reactant of (A) the thermoplastic polyester resin and (C) the epoxy compound in which the number of epoxy functional groups per molecule is two, is preferably as low as possible, preferably 20 eq/t or less, and further, particularly preferably 15 eq/t or less. In the most preferable aspect, it is 0 eq/t. In this regard, the concentration of carboxyl groups derived from (A) the thermoplastic polyester resin, the concentration of carboxyl groups derived from the reactant of (A) the thermoplastic polyester resin and (B) the novolac type epoxy resin represented by general formula (1), and the concentration of carboxyl groups derived from the reactant of (A) the thermoplastic polyester resin and (C) the epoxy compound in which the number of epoxy functional groups per molecule is two, with respect to the total amount of (A) the thermoplastic polyester resin, the reactant of (A) the thermoplastic polyester resin and (B) the novolac type epoxy resin represented by general formula (1), and the reactant of (A) the thermoplastic polyester resin and (C) the epoxy compound in which the number of epoxy functional groups per molecule is two in the thermoplastic polyester resin composition can be calculated by dissolving the thermoplastic polyester resin composition in a mixed solution of o-cresol/chloroform (2/1, vol/vol) and then titrating the solution with 0.05 mol/L ethanolic potassium hydroxide, using 1% bromophenol blue as an indicator.

As the second factor to impart hydrolysis resistance that cannot be achieved by conventional technologies, it is important that carboxyl groups newly produced by the hydrolysis of the thermoplastic polyester resin be allowed to react with epoxy groups to thereby suppress an increase of carboxyl groups. From that viewpoint, the concentration of epoxy groups in the thermoplastic polyester resin composition obtained by melt kneading is preferably 30 eq/t or more. It is more preferably 40 g/eq or more, particularly preferably 50 eq/t or more. The concentration of epoxy groups in the thermoplastic polyester resin composition obtained by melt kneading being 150 eq/t or less is preferable because it can achieve the long-term hydrolysis resistance, melt stability at high temperature, and mechanical properties at a higher level at the same time. It is preferably 130 eq/t or less. In this regard, the concentration of epoxy groups in the thermoplastic polyester resin composition can be calculated by dissolving the thermoplastic polyester resin composition in a mixed solution of o-cresol/chloroform (2/1, vol/vol), adding acetic acid and a triethylammonium bromide/acetic acid solution thereto, and then subjecting the resultant solution to potential-difference titration with 0.1 mol/L acetate perchlorate.

For the thermoplastic polyester resin composition, (A) the thermoplastic polyester resin can be further blended with the reducing phosphorus compound represented by general formula (4) (D). The concentration of carboxyl groups in (A) the thermoplastic polyester resin is increased by the decomposition of the ester groups that is caused by oxidative degradation under a high temperature environment, and thereby the hydrolysis resistance, strength, and color tone of the resin are degraded. Thus, even if the thermoplastic polyester resin composition contains (B) the novolac type epoxy resin represented by general formula (1), there are some cases in which the composition has insufficient hydrolysis resistance when exposed to a high temperature environment for hours or retained in the molten state at high temperature. Then, further blending (D) the reducing phosphorus compound allows (D) the reducing phosphorus compound to reduce organic peroxides generated by oxidative degradation, and can suppress the increase of carboxyl groups generated as decomposition products. At the same time, the resin composition can maintain its color tone.

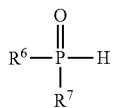

(4)

wherein, in general formula (4), $R^6$ and $R^7$ are independently selected from hydrogen (but there is no instance where both $R^6$ and $R^7$ are hydrogen), OM (wherein O is a negatively-charged oxygen atom and M is a positively-charged counterion), $C_1$-$C_{20}$ alkyl, $C_2$-$C_{20}$ alkylene, $C_6$-$C_{20}$ aryl, $C_1$-$C_{20}$ alkyloxy, polyoxyalkylene including $C_2$-$C_4$ alkylene, and $C_6$-$C_{20}$ aryloxy; the alkyl, alkylene, aryl, alkyloxy, polyoxyalkylene, and aryloxy may be optionally substituted, and the optionally substituted substituents are independently selected from OH group, halogen, COOH group, $COOR^8$ group (wherein $R^8$ is $C_1$-$C_4$ alkyl) and $NH_2$ group; in a case where the alkyl, alkylene, aryl, alkyloxy, polyoxyalkylene, and aryloxy are optionally substituted, the number of substituents is 1 or 2; and $R^6$ and $R^7$ can be linked by cross-linking.)

Specific examples of (D) the reducing phosphorus compound represented by general formula (4) include phosphonate compounds, phosphinate compounds and the like.

Examples of phosphonate compounds include phosphonic acids, alkyl phosphonates, aryl phosphonates, metal salts thereof, and the like. Specific examples include dimethyl phosphonate, diethyl phosphonate, diphenyl phosphonate, metal salts of phosphonic acids and the like.

Examples of phosphinate compounds include hypophosphorous acids, alkyl hypophosphites, aryl hypophosphites, alkylated hypophosphorous acids, arylated hypophosphorous acids, alkyl esters or aryl esters thereof, metal salts thereof, and the like. Specific examples include phosphinic acid, methylphosphinic acid, ethylphosphinic acid, propylphosphinic acid, isopropylphosphinic acid, butylphosphinic acid, phenylphosphinic acid, tolylphosphinic acid, xylylphosphinic acid, biphenylylphosphinic acid, naphthylphosphinic acid, anthrylphosphinic acid, alkyl esters or aryl esters thereof, metal salts thereof and the like.

Among these, a metal phosphite or a metal hypophosphite is preferable, a metal hypophosphite is more preferable, and sodium hypophosphite is particularly preferable, in that they can not only suppress the oxidative degradation of (A) the thermoplastic polyester resin but also suppress the oxidative degradation of (B) the novolac type epoxy resin represented by general formula (1) and further improve the hydrolysis resistance and color tone of the molded articles.

In addition, the compounded amount of (D) the reducing phosphorus compound represented by general formula (4) is preferably 0.01 to 1 part by weight with respect to (A) 100 parts by weight of the thermoplastic polyester resin. The compounded amount of (D) the reducing phosphorus compound being 0.01 parts by weight or more can improve the oxidative degradation resistance. It is more preferably, 0.02 parts by weight or more, still more preferably 0.05 parts by weight or more. On the other hand, the compounded amount of (D) the reducing phosphorus compound being 1 part by weight or less can improve the mechanical properties, hydrolysis resistance, and bleed-out resistance. It is more preferably 0.5 parts by weight or less, still more preferably 0.3 parts by weight or less.

It is preferable that thermoplastic polyester resin composition further contain (E) a phosphorus-containing stabilizer. In the thermoplastic polyester resin composition, (B) the novolac type epoxy resin represented by general formula (1) reacts with carboxyl end groups, and besides, epoxy functional groups react with each other at a high temperature of 270° C. or more and are cross-linked, thereby causing the melt stability to be lowered. Containing (E) the phosphorus-containing stabilizer together with (B) the novolac type epoxy resin represented by general formula (1) can suppress the cross-linking between (B) the novolac type epoxy resins represented by general formula (1) and further improve the melt stability at a high temperature of 270° C. or more. The phosphorus-containing stabilizers (E) include nothing that falls under the reducing phosphorus compounds (D).

(E) The phosphorus-containing stabilizer refers to a compound containing a structure represented by structural formula (5), in other words, a structure in which two or more oxygen atoms are bound to a phosphorus atom having an unshared electron pair. Having such a structure allows the stabilizer to coordinate to phenoxy radicals or quinones that are derived from the novolac type epoxy resin and cause coloring, and to decompose them or prevent coloring. In this regard, the atomic value of a phosphorus atom is 5 in common phosphorus compounds, and thus the upper limit is 3 as the number of oxygen atoms that can be bound to a phosphorus atom having an unshared electron pair.

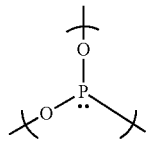

(5)

Examples of the phosphorus-containing stabilizers (E) include: phosphonite compounds as compounds containing a structure in which two oxygen atoms are bound to a phosphorus atom having an unshared electron pair; phosphite compounds as compounds containing a structure in which three oxygen atoms are bound to a phosphorus atom having an unshared electron pair; and the like.

Examples of phosphonite compounds include condensates of: a phosphonous acid compound such as phenyl phosphonous acid or 4,4'-biphenylene diphosphonous acid; and a $C_4$-$C_{25}$ aliphatic alcohol and/or a phenol compound such as 2,6-di-t-butylphenol or 2,4-di-t-butyl-5-methyl phenol. Specific examples include bis(2,4-di-t-butyl-5-methylphenyl)-phenylphosphonite, tetrakis(2,4-di-t-butyl-5-methylphenyl)-4,4'-biphenylene diphosphonite, tetrakis(2,4-di-t-butylphenyl)-4,4'-biphenylene diphosphonite.

Among these, tetrakis(2,4-di-t-butyl-5-methylphenyl)-4,4'-biphenylene diphosphonite and tetrakis(2,4-di-t-butylphenyl)-4,4'-biphenylene diphosphonite are preferable in terms of the heat resistance stability of the phosphorus-containing stabilizers (E).

Examples of phosphite compounds include condensates of: phosphorous acid; and a $C_4$-$C_{25}$ aliphatic alcohol, a polyol such as glycerol or pentaerythritol, and/or a phenol compound such as 2,6-di-t-butylphenol or 2,4-di-t-butylphenol. Specific examples include: triisodecyl phosphite; tris-nonylphenyl phosphite; diphenylisodecyl phosphite; phenyldiisodecyl phosphite; 2,2-methylene bis(4,6-di-t-butylphenyl)octyl phosphite; 4,4'-butylidene bis(3-methyl-6-t-butylphenyl)ditridecyl phosphite; tris(alkylaryl) phosphites (in this case, however, the alkyl groups are $C_3$-$C_6$ branched alkyl groups) such as tris(2,4-di-t-butylphenyl) phosphite, tris(2-t-butyl-4-methylphenyl)phosphite, tris(2,4-di-t-amylphenyl)phosphite, tris(2-t-butylphenyl)phosphite, tris[2-(1,1-dimethylpropyl)-phenyl]phosphite, and tris[2,4-(1,1-dimethylpropyl)-phenyl]phosphite; bis(2-t-butylphenyl)phenyl phosphite; tris(2-cyclohexylphenyl)phosphite; tris(2-t-butyl-4-phenylphenyl)phosphite; bis(alkylaryl)pentaerythritol diphosphites (in this case, however, the alkyl groups are $C_3$-$C_9$ alkyl groups) such as bis(octyl)pentaerythritol diphosphite, bis(octadecyl)pentaerythritol diphosphite, bis(2,4-di-t-butyl-4-methylphenyl)pentaerythritol diphosphite, bis(2,6-di-t-butyl-4-methylphenyl)pentaerythritol diphosphite, bis(nonylphenyl)pentaerythritol diphosphite, and bis(nonylphenyl)pentaerythritol diphosphite; and the like. Two or more of these may be used.

Among these, bis(alkylaryl)pentaerythritol diphosphites are preferable, and bis(2,4-di-t-butyl-4-methylphenyl)pentaerythritol diphosphite and bis(2,6-di-t-butyl-4-methylphenyl)pentaerythritol diphosphite are more preferable, in terms of the heat resistance stability of the phosphorus-containing stabilizers (E).

The compounded amount of (E) the phosphorus-containing stabilizer may be adjusted in accordance with the type and the compounded amount of (B) the novolac type epoxy resin represented by general formula (1), and is preferably 0.01 to 1 part by weight with respect to (A) 100 parts by weight of the thermoplastic polyester resin. The compounded amount of (E) the phosphorus-containing stabilizer being 0.01 parts by weight or more can improve the color tone. It is more preferably 0.05 parts by weight or more. On the other hand, the compounded amount of (E) the phosphorus-containing stabilizer being 1 part by weight or less can further improve the long-term hydrolysis resistance and mechanical properties. It is more preferably 0.5 parts by weight or less.

It is preferable that the thermoplastic polyester resin composition further contain (F) a fibrous reinforcing filler.

(F) the fibrous reinforcing filler can further improve the mechanical strength and the heat resistance.

Specific examples of the fibrous reinforcing fillers (F) include glass fibers, aramid fibers, carbon fibers and the like. As the glass fiber, preferably used is a chopped strand-type or a robing-type glass fiber that is treated with a silane coupling agent such as an aminosilane compound or an epoxysilane compound, and/or a sizing agent containing: a urethane; a copolymer including an acrylic acid such as an acrylic acid/styrene copolymer; a copolymer including a maleic anhydride such as a methyl acrylate/methyl methacrylate/maleic anhydride copolymer; vinyl acetate; one or more kinds of epoxy compounds such as bisphenol-A type diglycidyl ethers and novolac type epoxy compounds; and the like; and a glass fiber treated with a sizing agent containing a copolymer including a maleic anhydride is more preferable in terms of further improving the hydrolysis resistance. The silane coupling agent and/or the sizing agent may be mixed in an emulsion liquid when used. The fiber diameter is usually preferably 1 to 30 μm. The lower limit is preferably 5 μm in terms of the dispersibility of glass fiber in resin. The upper limit is preferably 15 μm in terms of mechanical strength. Though the fiber cross section is usually circular, it is possible to use a fibrous reinforcing filler with an arbitrary cross section, for example, a glass fiber with an elliptic cross section, a glass fiber with a flattened elliptic cross section, and a glass fiber with a dumbbell-shaped cross section, of an arbitrary aspect ratio and such a fibrous reinforcing filler allows for improving the flowability during injection molding, and for producing a molded article with less warpage.

The compounded amount of (F) the fibrous reinforcing filler is preferably 1 to 100 parts by weight with respect to (A) 100 parts by weight of the thermoplastic polyester resin. Containing (F) 1 part by weight or more of the fibrous reinforcing filler can further improve the mechanical strength and the heat resistance. It is preferably 2 parts by weight or more, more preferably 3 parts by weight or more. On the other hand, containing (F) 100 parts by weight or less of the fibrous reinforcing filler can further improve the mechanical strength and the heat resistance. It is preferably 95 parts by weight or less, more preferably 90 parts by weight or less.

It is preferable that the thermoplastic polyester resin composition further contain (G) the reaction accelerator. (G) the reaction accelerator can accelerate reaction between: the carboxyl end groups of (A) the thermoplastic polyester resin; and the epoxy groups of (B) the novolac type epoxy resin represented by general formula (1) and the epoxy groups of (C) the epoxy compound in which the number of epoxy functional groups per molecule is two, thereby improving the long-term hydrolysis resistance significantly. (G) The reaction accelerator is not limited to a particular one
- as long as it can accelerate the reaction between: the carboxyl end groups of (A) the thermoplastic polyester resin; and the epoxy groups of (B) the novolac type epoxy resin represented by general formula (1) and the epoxy groups of (C) the epoxy compound in which the number of epoxy functional groups per molecule is two, and, for example, tertiary amines, amidine compounds, organic metal compounds, organic phosphine and salts thereof, imidazole, boron compounds, and the like can be used. Two or more of these may be included.

Examples of tertiary amines include; benzyldimethylamine; 2-(dimethylamino-methyl)phenol; 2,4,6-tris(diaminomethyl)phenol; and salt of 2,4,6-tris(diaminomethyl)phenol and tri-2-ethylhexylic acid; and the like.

Examples of amidine compounds include 1,8-diazabicyclo(5,4,0)undecene-7,1,5-diazabicyclo(4,3,0)nonene-5,5,6-dibutylamino-1,8diazabicyclo(5,4,0)undecene-7,7-methyl-1,5,7-triazabicyclo(4,4,0)decene-5 and the like. In addition, the amidine compounds may be used in the form of a salt made with an inorganic acid or an organic acid, examples of such salts including 1,8-diazabicyclo(5,4,0)undecene-7 tetraphenylborate.

Examples of organic metal compounds include: metal stearates such as sodium stearate, magnesium stearate, calcium stearate, potassium stearate, and lithium stearate; chromium acetylacetonate, zinc acetylacetonate, nickel acetylacetonate, triethanolamine titanate, tin octoate and the like.

Examples of organic phosphines and salts thereof include triparatolylphosphine, tris-4-methoxyphenylphosphine, tetrabutylphosphonium bromide, butyltriphenylphosphonium bromide, tetraphenylphosphonium tetraphenylborate, triphenylphosphine, triphenylphosphine triphenylborane, triphenylphosphine 1,4-benzoquinone adducts and the like.

Examples of imidazoles include 2-methylimidazole, 2-aminoimidazole, 2-methyl-1-vinylimidazole, 2-ethyl-4-methylimidazole, 2-heptadecylimidazole, 2-phenylimidazole, 2-undecylimidazole, 1-allylimidazole, 1-cyanoethyl-2-methylimidazole, 1-cyanoethyl-2-undecylimidazole, 1-cyanoethyl-2-undecylimidazolium trimellitate, 1-benzyl-2-methylimidazole, 1-cyanoethyl-2-ethyl-4-methylimidazole, 1-cyanoethyl-2-phenylimidazolium trimellitate, 1-dodecyl-2-methyl-3-benzylimidazolium chloride, 2-methylimidazolium isocyanurate, 2-phenylimidazolium isocyanurate, 2,4-diamino-6-[2-methylimidazolyl-(1)]ethyl S-triazine, 1,3-dibenzyl-2-methylimidazolium chloride, 1,3-diaza-2,4-cyclopentadiene, 1-cyanoethyl-2-phenyl-4,5-di(cyanoethoxymethyl)imidazole, 2-phenyl-4,5-dihydroxymethylimidazole, 2-phenyl-4-methyl-5-hydroxymethylimidazole, 2,4-diamino-6-[2-undecylimidazolyl-(1)]ethyl-S-triazine and the like.

Examples of boron compounds include boron trifluoride-n-hexylamine, boron trifluoride-monoethylamine, boron trifluoride-benzylamine, boron trifluoride-diethylamine, boron trifluoride-piperidine, boron trifluoride-triethylamine, boron trifluoride-aniline, boron tetrafluoride-n-hexylamine, boron tetrafluoride-monoethylamine, boron tetrafluoride-benzylamine, boron tetrafluoride-diethylamine, boron tetrafluoride-piperidine, boron tetrafluoride-triethylamine, boron tetrafluoride-aniline and the like.

(G) The reaction accelerator preferably contains nitrogen or phosphorus and is preferably an amidine compound, an organic phosphine or a salt thereof, imidazole, or the like, more preferably an organic phosphine or a salt thereof, in that (G) the reaction accelerator can further accelerate reactivity between the carboxyl end groups of (A) the thermoplastic polyester resin and (B) the novolac type epoxy resin represented by general formula (1) and further improve the long-term hydrolysis resistance.

The compounded amount of (G) the reaction accelerator is preferably 0.001 to 1 part by weight with respect to (A) 100 parts by weight of the thermoplastic polyester resin. The compounded amount of (G) the component being 0.001 parts by weight or more can further improve the long-term hydrolysis resistance. On the other hand, the compounded amount of (G) the component being 1 part by weight or less can further improve the long-term hydrolysis resistance while maintaining the mechanical properties.

The preferable range of the compounded amount of (G) the reaction accelerator can be determined in accordance with the compounded amount of (B) the novolac type epoxy resin represented by general formula (1) and the compounded amount of (C) the epoxy compound in which the number of epoxy functional groups per molecule is two. For example, the ratio of the compounded concentration of (G) the reaction accelerator in the thermoplastic polyester resin composition with respect to the sum of the amount of epoxy groups derived from (B) the novolac type epoxy resin represented by general formula (1) and the amount of epoxy groups derived from (C) the epoxy compound in which the number of epoxy functional groups per molecule is two contained in the thermoplastic polyester resin composition (the compounded concentration of (G) the reaction accelerator (eq/g)/the sum of the amount of epoxy groups derived from (B) the component and the amount of epoxy groups derived from (C) the component (eq/g); hereinafter may be referred to as "the compounded concentration of the reaction accelerator/the concentration of epoxy groups") is preferably 0.005 to 0.1. The compounded concentration of the reaction accelerator/the concentration of epoxy groups being 0.005 or more can further improve the long-term hydrolysis resistance. It is more preferably 0.01 or more, still more preferably 0.015 or more. On the other hand, the compounded concentration of the reaction accelerator/the concentration of epoxy groups being 0.1 or less can achieve the long-term hydrolysis resistance, melt stability, and mechanical properties at a higher level at the same time. It is more preferably 0.08 or less, still more preferably 0.06 or less.

In this regard, the amount of epoxy groups derived from (B) the novolac type epoxy resin represented by general formula (1) contained in the thermoplastic polyester resin composition and the amount of epoxy groups derived from (C) the epoxy compound in which the number of epoxy functional groups per molecule is two contained in the thermoplastic polyester resin composition can be determined from: the concentration of epoxy groups of (B) the component alone and that of (C) the component alone; and the compounded ratio of (B) the component and that of (C) the component in the whole thermoplastic polyester resin composition, respectively. The concentration of epoxy groups of (B) the novolac type epoxy resin represented by general formula (1) and the concentration of epoxy groups of (C) the epoxy compound in which the number of epoxy functional groups per molecule is two can be calculated, in accordance with JIS K 7236: 2001, by dissolving (B) the novolac type epoxy resin represented by general formula (1) and (C) the epoxy compound in which the number of epoxy functional groups per molecule is two each in chloroform, adding acetic acid and a triethylammonium bromide/acetic acid solution to each solution, and then subjecting the resultant solution to potential-difference titration with 0.1 mol/L acetate perchlorate.

In addition, the compounded concentration of (G) the reaction accelerator in the thermoplastic polyester resin composition can be calculated from the molecular weight of the reaction accelerator and the compounded ratio of (G) the component in the whole thermoplastic polyester resin composition.

The thermoplastic polyester resin composition can contain a reinforcing filler other than a fibrous reinforcing filler, to the extent that the desired effect is not impaired, and can contain, for example, an inorganic filler. Containing an inorganic filler can partially improve the crystallization characteristics, arc resistance, anisotropy, mechanical strength, flame retardance, or heat distortion temperature of the resulting molded article, and especially a molded article with less warpage can be produced because of the effect in reducing anisotropy.

Examples of the reinforcing fillers other than fibrous reinforcing fillers include acicular, granular, powdered, and layered inorganic fillers, and specific examples include glass beads, milled fibers, glass flakes, potassium titanate whisker, calcium sulfate whisker, wollastonite, silica, kaolin, talc, calcium carbonate, zinc oxide, magnesium oxide, aluminum oxide, magnesium oxide/aluminum oxide mixtures, silicic acid fine powder, aluminum silicate, silicon oxide, smectite clay minerals (montmorillonite, hectorite), vermiculite, mica, fluorine taeniolite, zirconium phosphate, titanium phosphate, dolomite, and the like. Two or more of these may be contained. The use of milled fibers, glass flakes, kaolin, talc and/or mica allows for providing a molded article with less warpage, because they are effective in reducing anisotropy. Further, when calcium carbonate, zinc oxide, magnesium oxide, aluminum oxide, a magnesium oxide/aluminum oxide mixture, silicic acid fine powder, aluminum silicate and/or silicon oxide are/is included in an amount of from 0.01 to 1 part by weight with respect to (A) 100 parts by weight of the thermoplastic polyester resin, the melt stability can further be improved.

The reinforcing fillers other than fibrous reinforcing fillers may be surface treated with a coupling agent, an epoxy compound, or by ionization. The inorganic filler in the form of granules, powders, and layers preferably have an average particle size of 0.1 to 20 μm in terms of impact strength. It is particularly preferably 0.2 μm or more in terms of the dispersibility of the inorganic filler in resin, preferably 10 μm or less in terms of mechanical strength. The compounded amount of the inorganic filler other than the fibrous reinforcing filler, combined with the compounded amount of the fibrous reinforcing filler, is preferably 100 parts by weight or less with respect to (A) 100 parts by weight of the thermoplastic polyester resin, in terms of improving the flowability during molding and the durability of the molding machine and mold. The compounded amount of the inorganic filler other than the fibrous reinforcing filler is preferably 1 to 50 parts by weight with respect to (A) 100 parts by weight of the thermoplastic polyester resin. The compounded amount of the inorganic filler other than the fibrous reinforcing filler being 1 part by weight or more can reduce the anisotropy and further improve the melt stability. It is preferably 2 parts by weight or more, more preferably 3 parts by weight or more. On the other hand, the compounded amount of the inorganic filler other than the fibrous reinforcing filler being 50 parts by weight or less can improve the mechanical strength.

The resin composition may contain one or more arbitrary additives such as an ultraviolet absorber, a light stabilizer, a plasticizer and an antistatic agent, to the extent that the desired object is not impaired.

The resin composition may also include a thermoplastic resin other than (A) the component, to improve the moldability, dimensional accuracy, mold shrinkage and toughness of the resin composition and the resulting molded article, to the extent that the desired object is not impaired. Examples of the thermoplastic resin other than (A) the component include: polyolefin resins, polyvinyl resins, polyamide resins, polyacetal resins, polyurethane resins, aromatic polyketone resins, aliphatic polyketone resins, polyphenylene sulfide resins, polyether ether ketone resins, polyimide resins, thermoplastic starch resins, aromatic polycarbonate resins, polyarylate resins, polysulfone resins, polyethersulfone resins, phenoxy resins, polyphenylene ether resins, poly-4-methylpentene-1, polyetherimide resins, cellulose acetate resins, polyvinyl alcohol resins and the like. Specific examples of the above-mentioned olefin resins include ethylene/propylene copolymers, ethylene/propylene/nonconjugated diene copolymers, ethylene-butene-1 copolymers, ethylene/glycidyl methacrylate copolymers, ethylene/butene-1/maleic anhydride copolymers, ethylene/propylene/maleic anhydride copolymers, ethylene/maleic anhydride copolymers and the like. Moreover, specific examples of the above-mentioned vinyl resins include vinyl (co)polymers such as methyl methacrylate/styrene resins (MS resins), methyl methacrylate/acrylonitrile resins, polystyrene resins, acrylonitrile/styrene resins (AS resins), styrene/butadiene resins, styrene/N-phenylmaleimide resins, and styrene/acrylonitrile/N-phenylmaleimide resins; styrene-based resins modified with a rubbery polymer such as acrylonitrile/butadiene/styrene resins (ABS resins), acrylonitrile/butadiene/methyl methacrylate/styrene resins (MABS resins), and high impact polystyrene resins; block copolymers such as styrene/butadiene/styrene resins, styrene/isoprene/styrene resins, and styrene/ethylene/butadiene/styrene resins; and still more, as core shell rubbers, multilayer structures of dimethylsiloxane/butyl acrylate (core layer) and methyl methacrylate polymer (shell layer), multilayer structures of dimethylsiloxane/butyl acrylate (core layer) and acrylonitrile/styrene copolymer (shell layer), multilayer structures of butadiene/styrene polymer (core layer) and methyl methacrylate polymer (shell layer), and multilayer structures of butadiene/styrene polymer (core layer), acrylonitrile/styrene copolymer (shell layer) and the like.

Among these, an olefin resin having high hydrolysis resistance is preferably added, in terms of improving the toughness and hydrolysis resistance of the resin composition.

The compounded amount of the olefin resin is preferably from 0.1 to 30 parts by weight with respect to (A) 100 parts by weight of the thermoplastic polyester resin. The compounded amount being 0.1 parts by weight or more further improves the toughness and hydrolysis resistance. The compounded amount is more preferably, 0.5 parts by weight or more, still more preferably 1 part by weight or more. On the other hand, the compounded amount being 30 parts by weight or less further improves the mechanical properties. The compounded amount is more preferably 20 parts by weight or less, still more preferably 10 parts by weight or less.

The resin composition can contain a polyol compound having three or four functional groups and containing one or more alkylene oxide units (hereinafter may be referred to as "polyol compound"). Containing such a compound can further improve the flowability in molding such as injection molding. The polyol compound may be a low-molecular weight compound or a polymer. Examples of functional groups include a hydroxyl group, an aldehyde group, a carboxylic acid group, a sulfo group, an amino group, a glycidyl group, an isocyanate group, a carbodiimide group, an oxazoline group, an oxazine group, an ester group, an amide group, a silanol group, a silyl ether group and the like. It is preferred to have three or four of the same or different functional groups from among these, and it is more preferred to have three or four of the same functional groups, particularly in terms of further improving the flowability, mechanical properties, durability, heat resistance and productivity.

Preferred examples of the alkylene oxide unit include aliphatic alkylene oxide units having from 1 to 4 carbon atoms. Specific examples thereof include a methylene oxide unit, an ethylene oxide unit, a trimethylene oxide unit, a propylene oxide unit, a tetramethylene oxide unit, a 1,2-butylene oxide unit, a 2,3-butylene oxide unit, an isobutylene oxide unit and the like.

In particular, it is preferred that a compound containing an ethylene oxide unit or a propylene oxide unit as the alkylene oxide unit be used, in terms of superior flowability, recyclability, durability, heat resistance and mechanical properties. Further, it is particularly preferred that a compound containing a propylene oxide unit be used, in terms of improving the long-term hydrolysis resistance and toughness (tensile elongation at break). As the number of alkylene oxide units, the alkylene oxide unit per functional group is preferably 0.1 or more, more preferably 0.5 or more, still more preferably 1 or more, in terms of superior flowability. On the other hand, the alkylene oxide unit per functional group is preferably 20 or less, more preferably 10 or less, still more preferably 5 or less, in terms of superior mechanical properties.

In addition, the polyol compound may react with (A) the thermoplastic polyester resin to be introduced into the main chain and/or side chains of (A) the component, or alternatively, the polyol compound may hold the same structure as when added, in the resin composition without reacting with (A) the component.

The compounded amount of the polyol compound is preferably 0.01 to 3 parts by weight with respect to (A) 100 parts by weight of the thermoplastic polyester resin. It is preferably 0.1 parts by weight or more in terms of flowability, more preferably 1.5 parts by weight or less in terms of mechanical strength.

The thermoplastic polyester resin composition can contain a flame retardant, to the extent that the desired effect is not impaired. Examples of the flame retardants include a phosphorus-based flame retardant, a halogen-based flame retardant such as a bromine-based flame retardant, a salt of a triazine compound and cyanuric acid or isocyanuric acid, a silicone-based flame retardant, an inorganic flame retardant and the like. Two or more of these may be included.

The compounded amount of a release agent is preferably 0.01 to 1 part by weight with respect to (A) 100 parts by weight of the thermoplastic polyester resin. It is more preferably 0.03 parts by weight or more in terms of mold release characteristics, more preferably 0.6 parts by weight or less in terms of heat resistance.

The resin composition can further contain one or more of carbon black, titanium oxide, and various types of color pigments and dyes so that it is possible to adjust the color of the resin composition to various types of colors, and to improve the weatherability (light resistance) and electrical conductivity thereof. Examples of carbon blacks include channel black, furnace black, acetylene black, anthracene black, lamp black, turpentine soot, graphite and the like. The carbon black to be used preferably has an average particle size of 500 nm or less, and a dibutyl phthalate oil absorption of from 50 to 400 $cm^3/100$ g. As the titanium oxide, one having a rutile-type or anatase-type crystalline structure, and an average particle size of 5 μm or less is preferably used.

The carbon black, titanium oxide and various types of color pigments and dyes may be surface treated with aluminum oxide, silicon oxide, zinc oxide, zirconium oxide, a polyol, a silane coupling agent or the like. Further, to improve the dispersibility in the thermoplastic polyester resin composition and the handleability during the production process, the above-mentioned carbon black, titanium oxide and various types of color pigments and dyes may be used in the form of a mixture with various types of thermoplastic resins that is obtained by melt blending or by simply blending these components.

The compounded amount of the pigment and dye is preferably from 0.01 to 3 parts by weight with respect to (A) 100 parts by weight of the thermoplastic polyester resin. It is preferably 0.03 parts by weight or more in terms of preventing color irregularity, more preferably 1 part by weight or less in terms of the mechanical strength.

The thermoplastic polyester resin composition can be obtained, for example, by melt kneading the components (A) to (C) and, as needed, other components.

Examples of melt kneading methods include: a method in which (A) the thermoplastic polyester resin, (B) the novolac type epoxy resin represented by general formula (1), (C) the epoxy compound in which the number of epoxy functional groups per molecule is two, and, as needed (D) the reducing phosphorus compound represented by general formula (4), and various types of additives are premixed, and the resulting mixture is then fed to an extruder or the like to be sufficiently melt kneaded; a method in which each of the components is fed to an extruder or the like in a specified amount, using a metering feeder such as a weight feeder, to be sufficiently melt kneaded; and the like.

Examples of premixing methods include: dry blending; mixing using a mechanical mixing machine such as a tumbler, a ribbon mixer, and a Henschel mixer; and the like. Alternatively, (F) the fibrous reinforcing filler and the inorganic filler other than the fibrous reinforcing filler may be fed through a side feeder installed between the breech-loading part and the vent of a multi screw extruder such as a twin screw extruder. When a liquid additive is used, a method to be used may be: a method in which the additive is added using a plunger pump through a liquid addition nozzle installed between the breech-loading part and the vent of a multi screw extruder such as a twin screw extruder; a method in which the additive is fed through the breech-loading part using a metering pump; and the like.

It is preferred that the thermoplastic polyester resin composition be formed into pellets, and then the pellets be subjected to molding processing. The formation of pellets can be carried out, for example, by extruding the resin composition in the form of strands using a single-screw extruder, a twin screw extruder, a triple-screw extruder, a conical extruder or a kneader-type mixer, equipped with "Uni-melt" or "Dulmage" type screw, and then by cutting the resulting strands using a strand cutter.

By melt-molding the thermoplastic polyester resin composition, it is possible to obtain a molded article in the form of a film, fiber, and other various types of shapes. Examples of melt-molding methods include methods such as injection molding, extrusion molding, blow molding and the like, and injection molding is particularly preferably used.

As an injection molding method, gas assist molding, two-color molding, sandwich molding, inmold molding, insert molding, injection press molding and the like are known besides common injection molding methods, and any of the molding methods can be applied.

The molded article can be used as molded articles for mechanical machine parts, electric components, electronic components and automotive parts, utilizing its excellent mechanical properties such as long-term hydrolysis resistance, tensile strength and elongation, and excellent heat resistance. In addition, the molded article is useful particularly as exterior parts, because of its excellent long-term hydrolysis resistance.

Specific examples of the mechanical machine parts, electric components, electronic component and automotive parts include: breakers, electromagnetic switches, focus cases, flyback transformers, molded articles for fusers of copying machines and printers, general household electrical appliances, housings of office automation devices, parts of variable capacitor cases, various types of terminal boards, transformers, printed wiring boards, housings, terminal blocks, coil bobbins, connectors, relays, disk drive chassis, switch parts, electrical outlet parts, motor components, sockets, plugs, capacitors, various types of casings, resistors, electric and electronic components into which metal terminals and conducting wires are incorporated, computer-related components, audio components such as acoustic components, parts of lighting equipment, telegraphic communication equipment-related components, telephone equipment-related components, components of air conditioners, components of consumer electronics such as VTRs and TVs, copying machine parts, facsimile machine parts, components of optical devices, components of automotive ignition system, connectors for automobiles, various types of automotive electrical components and the like.

EXAMPLES

The effects of the thermoplastic polyester resin composition will now be described specifically, by way of Examples. Raw materials used in Examples and Comparative Examples are shown below: Note that, all "%" and "part(s)" as used herein represent "% by weight" and "part(s) by weight" respectively, and "/" in the names of the below-mentioned resins indicates copolymerization.

(A) Thermoplastic Polyester Resin
<A-1> Polybutylene terephthalate resin: a polybutylene terephthalate resin having a carboxyl end group concentration of 30 eq/t, manufactured by Toray Industries, Inc., was used.
<A-2> Polyethylene terephthalate resin: a polyethylene terephthalate resin having a carboxyl end group concentration of 40 eq/t, manufactured by Toray Industries, Inc., was used.

(B) Novolac Type Epoxy Resin Represented by General Formula (1)
<B-1> Novolac type epoxy resin represented by general formula (6) and having an epoxy equivalent of 253 g/eq: "XD-1000" manufactured by Nippon Kayaku Co., Ltd. was used.

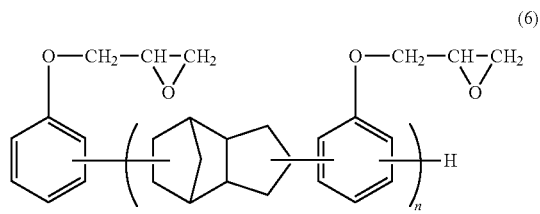

(6)

In General Formula (6), n Represents a Value from 1 to 3.
<B-2> Novolac type epoxy resin represented by general formula (7) and having an epoxy equivalent of 290 g/eq: "NC-3000H" manufactured by Nippon Kayaku Co., Ltd. was used.

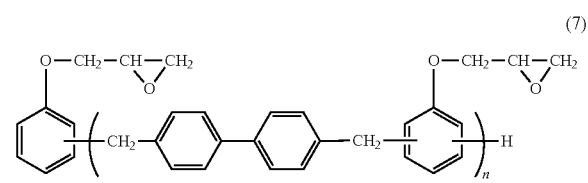

(7)

In general formula (7), n represents a value from 2 to 4.
(B') Novolac type epoxy resin other than represented by general formula (1)
<B'-1> Novolac type epoxy resin represented by general formula (8) and having an epoxy equivalent of 211 g/eq: "EOCN-102S" manufactured by Nippon Kayaku Co., Ltd. was used.

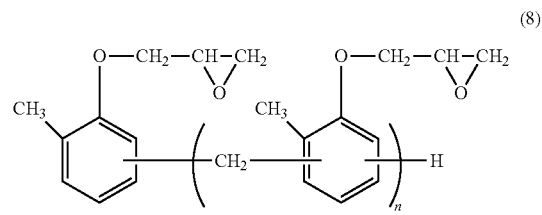

(8)

In general formula (8), n represents a value from 3 to 5.
(C) Epoxy Compound in Which the Number of Epoxy Functional Groups per Molecule is Two
<C-1> bisphenol-A type epoxy having an epoxy equivalent of 192 g/eq: "jER" (registered trademark) 819 manufactured by Mitsubishi Chemical Corp. was used.
<C-2> bisphenol-A type epoxy having an epoxy equivalent of 630 g/eq: "jER" (registered trademark) 1002 manufactured by Mitsubishi Chemical Corp. was used.
<C-3> bisphenol-A type epoxy having an epoxy equivalent of 906 g/eq: "jER" (registered trademark) 1004 manufactured by Mitsubishi Chemical Corp. was used.
<C-4> bisphenol-A type epoxy having an epoxy equivalent of 1891 g/eq: "jER" (registered trademark) 1007 manufactured by Mitsubishi Chemical Corp. was used.
<C-5> bisphenol-A type epoxy having an epoxy equivalent of 7989 g/eq: "jER" (registered trademark) 1256 manufactured by Mitsubishi Chemical Corp. was used.
<C-6> Diglycidyl o-phthalate having an epoxy equivalent of 165 g/eq: "Denacol" (registered trademark) EX721 manufactured by Nagase Chemtex Corporation was used.
(D) Reducing Phosphorus Compound Represented by General Formula (4)
<D-1> Sodium hypophosphite: sodium hypophosphite (reagent) manufactured by Tokyo Chemical Industry Co., Ltd. was used.
<D-2> Disodium phosphite: disodium phosphite (reagent) manufactured by Tokyo Chemical Industry Co., Ltd. was used.
<D-3> Diphenyl hydrogen phosphite: diphenyl hydrogen phosphite (reagent) manufactured by Tokyo Chemical Industry Co., Ltd. was used.
(E) Phosphorus-Containing Stabilizer
<E-1> Bis(2,6-di-t-butyl-4-methylphenyl)pentaerythritol diphosphite: "ADEKASTAB" (registered trademark) PEP36 manufactured by ADEKA Corp. was used.
<E-2> Tetrakis(2,4-di-t-butylphenyl)-4,4'-biphenylene diphosphonite: "HOSTANOX" (registered trademark) P-EPQ manufactured by Clariant (Japan) K. K. was used.
(F) Fibrous Reinforcing Filler
<F-1> Glass fiber treated with a sizing agent containing an epoxy compound: a glass fiber, ECSO3T-187, having a cross-sectional diameter of 13 μm and a fiber length of 3 mm, manufactured by Nippon Electric Glass Co., Ltd., was used.
<F-2> Glass fiber treated with a sizing agent containing a copolymer including a maleic anhydride: a glass fiber, ECSO3T-253, having a cross-sectional diameter of 13 μm and a fiber length of 3 mm, manufactured by Nippon Electric Glass Co., Ltd., was used.
(G) Reaction Accelerator
<G-1> Amidine compound: 1,8-diazabicyclo(5,4,0)undecene-7, "DBU" (registered trademark), having a molecular weight of 152.2, manufactured by San-Apro Ltd., was used.
<G-2> Imidazole: 2-ethyl-4-methylimidazole, 2E4MZ, having a molecular weight of 110.2, manufactured by Shikoku Chemicals Corporation, was used.
<G-3> Organic phosphine and salt thereof: tetraphenylphosphonium bromide, tetraphenylphosphonium bromide (reagent) having a molecular weight of 419.3, manufactured by Tokyo Chemical Industry Co., Ltd., was used.
(H) Other Additives
<H-1> Olefin resin: an ethylene/glycidyl methacrylate copolymer, "LOTADER" (registered trademark) AX8840 (tradename), manufactured by Elf Atochem, Inc., was used.
Measuring Methods for Each Characteristic
The characteristics in Examples and Comparative Examples were evaluated by the below-mentioned measuring methods.
1. Compounded Amount of Carboxyl Groups Derived from (A) Component
A solution obtained by dissolving (A) the thermoplastic polyester resin in a mixed solution of o-cresol/chloroform (2/1, vol/vol) was titrated with 0.05 mol/L ethanolic potassium hydroxide, using 1% bromophenol blue as an indicator, and the concentration of carboxyl groups was calculated by the following equation. Blue (color D55-80 (2007 D Edition, Pocket-type, published by Japan Paint Manufacturers Association)) was used as the end point of the titration.

> The concentration of carboxyl groups [eq/g]=(the amount of 0.05 mol/L ethanolic potassium hydroxide [ml] required for the titration of the mixed solution of o-cresol/chloroform (2/1, vol/vol) in which (A) the component is dissolved–the amount of 0.05 mol/L ethanolic potassium hydroxide [ml] required for the titration of the mixed solution of o-cresol/chloroform (2/1, vol/vol))×the concentration of 0.05 mol/L ethanolic potassium hydroxide [mol/ml]×1/(A) the component amount taken [g] used in the titration.

The compounded amount of the carboxyl groups derived from (A) in the thermoplastic polyester resin composition was calculated according to the following equation, from the concentration of carboxyl groups in (A) the component calculated based on the result of the above-mentioned titration, and from the whole amount of the thermoplastic polyester resin composition.

> The compounded amount of carboxyl groups derived from (A) in the thermoplastic polyester resin composition [eq/g]=(the concentration of carboxyl groups in (A) the component [eq/g]×the compounded amount of (A) the component [parts by weight])/the total amount of the thermoplastic polyester resin composition [parts by weight]

2. Compounded Amount of Epoxy Groups Derived from (B) Component

The concentration of epoxy groups was calculated on the basis of the below-mentioned equation, in accordance with JIS K 7236:2001, by dissolving (B) the novolac type epoxy resin represented by general formula (1) in chloroform, adding acetic acid and a triethylammonium bromide/acetic acid solution, and then subjecting the resultant solution to potential-difference titration with 0.1 mol/L acetate perchlorate.

> The concentration of epoxy groups [eq/g]=(the amount of 0.1 mol/L acetate perchlorate [ml] required for the titration of the solution resulting from adding acetic acid and a triethylammonium bromide/acetic acid solution to the chloroform in which (B) the component is dissolved–the amount of 0.1 mol/L acetate perchlorate [ml] required for the titration of the solution resulting from adding acetic acid and a triethylammonium bromide/acetic acid solution to chloroform)×the concentration of 0.1 mol/L acetate perchlorate [mol/ml]×1/the collected amount of (B) the component used in the titration [g]

The compounded amount of epoxy groups derived from (B) the component in the thermoplastic polyester resin composition was calculated in accordance with the following equation, from the concentration of epoxy groups of (B) the component calculated on the basis of the result of the above-mentioned potential-difference titration, and from the total amount of the thermoplastic polyester resin composition.

> The compounded amount of epoxy groups derived from (B) in the thermoplastic polyester resin composition [eq/g]=(the concentration of epoxy groups in (B) the component [eq/g]×the compounded amount of (B) the component [parts by weight])/the total amount of the thermoplastic polyester resin composition [parts by weight]

For the purpose of reference, calculations were made by reading (B') for (B) when a novolac type epoxy resin other than represented by general formula (1) (B') was used.
3. Compounded Concentration of Reaction Accelerator The compounded concentration of the reaction accelerator in the thermoplastic polyester resin composition was calculated in accordance with the following equation, from the molecular weight and compounded amount of the reaction accelerator, and from the total amount of the thermoplastic polyester resin composition.

> The compounded concentration of the reaction accelerator in the thermoplastic resin composition [eq/g]=(1/the molecular weight of (G) the component×the compounded amount of (G) the component [parts by weight])/the total amount of the thermoplastic polyester resin composition [parts by weight]

4. Mechanical Properties (Tensile Strength and Tensile Elongation)

The ASTM No. 1 dumbbell-shaped test specimens having a thickness of ⅛ inches (about 3.2 mm) for evaluating tensile properties were obtained using an injection molding machine, IS55EPN, manufactured by Toshiba Machine Co., Ltd., in the temperature conditions of a molding temperature of 250° C. and a mold temperature of 80° C. when a polybutylene terephthalate resin was used as (A) the component; and in the temperature conditions of a molding temperature of 270° C., and a mold temperature of 80° C. when a polyethylene terephthalate resin was used as (A) the component, and in the molding cycle condition with 10 seconds of the total of injection and retention times and 10 seconds of cooling time. The obtained test specimens for evaluating tensile properties were used to measure the maximum tensile strength point (tensile strength) and the maximum tensile elongation point (tensile elongation) in accordance with ASTM D638 (2005). The mean of the measured values of the respective three test specimens was taken as the respective value. Materials with higher values of tensile strength were evaluated to have better mechanical strength, and materials with higher values of tensile elongation were evaluated to have better toughness.

5. Heat Resistance (Heat Distortion Temperature)

The dumbbell-shaped test specimens having a thickness of ⅛ inches (about 3.2 mm) for evaluating heat distortion temperature were obtained using an injection molding machine, IS55EPN, manufactured by Toshiba Machine Co., Ltd., under the same injection molding conditions as described for the preparation of the test specimens for evaluating the tensile properties in item 4. The obtained test specimens for evaluating heat distortion temperature were used to measure heat distortion temperatures under the condition of a measuring load of 1.82 MPa in accordance with ASTM D648 (2005). The mean of the measured values of the respective three test specimens was taken as the respective value. Materials with a heat distortion temperature of less than 50° C. were evaluated to have lower heat resistance, and materials with a larger value for heat distortion temperature were evaluated to have better heat resistance.

6. Long-Term Hydrolysis Resistance (Tensile Strength Retention)

The ASTM No. 1 dumbbell-shaped test specimens having a test specimen thickness of ⅛ inches (about 3.2 mm) for evaluating tensile properties were obtained using an injection molding machine, IS55EPN, manufactured by Toshiba Machine Co., Ltd., under the same injection molding conditions as described for the preparation of the test specimens for evaluating the tensile properties in the item 4. The obtained ASTM No. 1 dumbbell test specimens were loaded into a highly accelerated stress test chamber EHS-411 manufactured by ESPEC Corp., with the chamber set to a temperature of 121° C. and a humidity of 100% RH, and were treated under heat and humidity for 96 hours (4 days). The thermoplastic polyester resin composition containing the reaction accelerator (G) was further treated under heat and humidity for 96 hours (4 days) (for the total of 192 hours (8 days)). The molded articles treated under heat and humidity were measured for the maximum tensile strength point under the same conditions as in the tensile test in the item 4, and the mean of the measured values of three specimens was determined. The tensile strength retention was determined in accordance with the following equation from the maximum tensile strength point measured subsequent to the treatment under heat and humidity and from the maximum tensile strength point measured prior to the treatment under heat and humidity.

The tensile strength retention (%)=(the maximum tensile strength point measured subsequent to the treatment under heat and humidity/the maximum tensile strength point measured prior to the treatment under heat and humidity)×100

Materials with a tensile strength retention of less than 50% were evaluated to have lower hydrolysis resistance, and materials with a larger value for tensile strength retention were evaluated to have superior hydrolysis resistance.

7. Melt Stability (Change Rate of Melt Viscosity Index)

The thermoplastic polyester resin composition was measured for melt viscosity index (or melt flow index) in accordance with ASTM D1238 (1999) using a C501DOS manufactured by Toyo Seiki Seisaku-sho, Ltd., under the conditions of a temperature of 250° C. and a load of 325 g and the conditions of a temperature of 270° C. and a load of 325 g.

Further, the thermoplastic polyester resin composition was retained in the cylinder for 30 minutes, and then measured for melt viscosity index under the same conditions, after which the differences (change rate (%)) between the melt viscosity indices obtained subsequent to retention relative to the melt viscosity index obtained prior to retention were determined. The change rate (%) calculated here is in absolute value, and it was calculated in positive value. Materials with a change rate of melt viscosity index of more than 50% were evaluated to have lower melt residence stability, and materials with a smaller value for the difference were evaluated to have superior melt residence stability.

8. Color Tone (Yellowness Index (YI))

The ASTM No. 1 dumbbell-shaped test specimens having a test specimen thickness of ⅛ inches (about 3.2 mm) for evaluating color tone were obtained using an injection molding machine, IS55EPN, manufactured by Toshiba Machine Co., Ltd., under the same injection molding conditions as described for the preparation of the test specimens for evaluating the tensile properties in item 4. The obtained ASTM No. 1 dumbbell-shaped test specimens were measured for color tone using a color-difference meter SE2000 manufactured by Nippon Denshoku Industry Co, Ltd., and the yellowness indices (YI values) were calculated. Materials with a yellowness index (YI value) of more than 30 were evaluated to have poorer color tone, and materials with a smaller yellowness index (YI value) were evaluated to have superior color tone.

9. Concentration of Carboxyl Groups (Concentration of Carboxyl Groups in Resin Components in the Resin Composition)

The concentration of carboxyl groups derived from (A) the thermoplastic polyester resin, the concentration of carboxyl groups derived from the reactant of (A) the thermoplastic polyester resin and (B) the novolac type epoxy resin represented by general formula (1), and the concentration of carboxyl groups derived from the reactant of (A) the thermoplastic polyester resin and (C) the epoxy compound in which the number of epoxy functional groups per molecule is two, with respect to the total amount of (A) the thermoplastic polyester resin, the reactant of (A) the thermoplastic polyester resin and (B) the novolac type epoxy resin represented by general formula (1), and the reactant of (A) the thermoplastic polyester resin and (C) the epoxy compound in which the number of epoxy functional groups per molecule is two in the thermoplastic polyester resin composition, were determined by: dissolving 2 g of the resin composition in 50 mL of a mixed solution of o-cresol/chloroform (2/1, vol/vol); titrating the solution with 0.05 mol/L ethanolic potassium hydroxide using 1% bromophenol blue as an indicator; calculating the concentration of carboxyl groups in the composition; and then multiplying the concentration by the compounded ratio of (A) the thermoplastic polyester resin.

10. Concentration of Epoxy Groups

The concentration of epoxy groups in the thermoplastic polyester composition was calculated by dissolving 2 g of the thermoplastic polyester resin composition in 30 mL of a mixed solution of o-cresol/chloroform (2/1, vol/vol), adding 20 mL of acetic acid and 10 mL of a triethylammonium bromide/20 wt % acetic acid solution, and then subjecting the resultant solution to potential-difference titration with 0.1 mol/L acetate perchlorate.

11. Chemical Resistance (Tensile Strength Retention)

The ASTM No. 1 dumbbell-shaped test specimens having a test specimen thickness of ⅛ inches (about 3.2 mm) for evaluating tensile properties were obtained using an injection molding machine, IS55EPN, manufactured by Toshiba Machine Co., Ltd., under the same injection molding conditions as described for the preparation of the test specimens for evaluating the tensile properties in item 4. The obtained ASTM No. 1 dumbbell-shaped test specimens were loaded into an oil bath BO601 manufactured by Yamato Scientific Co., Ltd., with the bath set to a temperature of 130° C. and filled with "Shell Sunlight Grease" (registered trademark), a grease comprising lithium hydroxylstearate and mineral oil, manufactured by Showa Shell Sekiyu K.K., and were treated for 500 hours. The molded articles treated in the chemical at high temperature were measured for the maximum tensile strength point under the same conditions as in the tensile test in item 4, and the mean of the measured values of three specimens was determined. The tensile strength retention was determined in accordance with the following equation from the maximum tensile strength point of the molded article treated in the chemical at high temperature and from the maximum tensile strength point of the untreated molded article.

The tensile strength retention (%)=(the maximum tensile strength point of the molded article treated in the chemical at high temperature/the maximum tensile strength point of the untreated molded article)×100

Materials with a tensile strength retention of less than 50% were evaluated to have lower chemical resistance, and materials with a larger value for tensile strength retention were evaluated to have superior chemical resistance.

12. Oxidative Degradation Resistance (Increase Rate of Concentration of Carboxyl Groups)

The ASTM No. 1 dumbbell-shaped test specimens having a test specimen thickness of ⅛ inches (about 3.2 mm) for evaluating tensile properties were obtained using an injection molding machine, IS55EPN, manufactured by Toshiba Machine Co., Ltd., under the same injection molding conditions as described for the preparation of the test specimens for evaluating the tensile properties in the item 4. For oxidative degradation testing, the obtained ASTM No. 1 dumbbell-shaped test specimens were allowed to stand on aluminium foil placed in a hot air oven PVH-222 manufactured by ESPEC Corp. for 15 minutes, with the oven set to a temperature of 270° C., and then were taken out. The test specimens taken out were cooled to room temperature, and then measured for the concentration of carboxyl groups under the same conditions as in item 9.

The increase rate of concentration of carboxyl groups was determined in accordance with the following equation from the concentration of carboxyl groups of the molded article treated by oxidative degradation and from the concentration of carboxyl groups of the untreated molded article.

The increase rate of concentration of carboxyl groups (%)=(the concentration of carboxyl groups of the molded article treated by oxidative degradation−the concentration of carboxyl groups of the untreated molded article)/the concentration of carboxyl groups of the untreated molded article×100

Materials with an increase rate of concentration of carboxyl groups of 70% or less were evaluated to have superior oxidative degradation resistance, and materials with an increase rate of concentration of carboxyl groups of 30% or less were evaluated to be particularly superior.

13. Bleed-Out

The ASTM No. 1 dumbbell-shaped test specimens having a test specimen thickness of ⅛ inches (about 3.2 mm) for evaluating bleed-out were obtained using an injection molding machine, IS55EPN, manufactured by Toshiba Machine Co., Ltd., under the same injection molding conditions as described for the preparation of the test specimens for evaluating the tensile properties in the item 4. The obtained ASTM No. 1 dumbbell test specimens were loaded into a highly accelerated stress test chamber EHS-411 manufactured by ESPEC Corp., with the chamber set to a temperature of 121° C. and a humidity of 100% RH, and were treated under heat and humidity for 96 hours (4 days). By a visual observation of the appearance of the molded article treated under heat and humidity, the bleed-out was determined in accordance with the following criteria.

A: No bleed-out of liquid nor white powder was observed on the molded article.

B: Bleed-out of liquid or white powder was observed on a part or parts of the molded article.

Examples 1 to 42, Comparative Examples 1 to 5

(A) The thermoplastic polyester resin, the novolac type epoxy resin (B) or (B'), (C) the epoxy compound in which the number of epoxy functional groups per molecule is two, and, as needed, (D) the reducing phosphorus compound, and (E) the phosphorus-containing stabilizer, (G) the reaction accelerator, and other materials were mixed at the composition ratios shown in Tables 1 to 6 and fed to a twin screw extruder through the breech-loading part, in which the extruder used was a co-rotating vent-type twin screw extruder (TEX-30α, manufactured by Japan Steel Works, LTD.) having a screw diameter of 30 mm and an L/D of 35. (F) the fibrous reinforcing filler was fed through a side feeder installed between the breech-loading part and the vent. Subsequently, melt mixing was performed under the extrusion conditions of a kneading temperature of 260° C. and a screw rotational speed of 150 rpm, the resulting resin composition was extruded in the form of strands and passed through a cooling bath, and the resulting strands were then cut into pellets using a strand cutter.

The resulting pellets were dried in a hot air dryer controlled at a temperature of 110° C. for 6 hours, whereafter the dried pellets were evaluated in accordance with the above-mentioned methods, with the results shown in Tables 1 to 6. The concentration of carboxyl groups derived from (A) the thermoplastic polyester resin, the concentration of carboxyl groups derived from the reactant of (A) the thermoplastic polyester resin and (B) the novolac type epoxy resin represented by general formula (1), and the concentration of carboxyl groups derived from the reactant of (A) the thermoplastic polyester resin and (C) the epoxy compound in which the number of epoxy functional groups per molecule is two, with respect to the total amount of (A) the thermoplastic polyester resin, the reactant of (A) the thermoplastic polyester resin and (B) the novolac type epoxy resin represented by general formula (1), and the reactant of (A) the thermoplastic polyester resin and (C) the epoxy compound in which the number of epoxy functional groups per molecule is two in the thermoplastic polyester resin composition, were described as "concentration of carboxyl groups in resin components in the resin composition" in the Tables.

TABLE 1

|  | Sign | Unit | \multicolumn{7}{c}{Examples} |
|---|---|---|---|---|---|---|---|---|---|
|  |  |  | 1 | 2 | 3 | 4 | 5 | 6 | 7 |
| (A) Thermoplastic polyester resin | A-1 | parts by weight | 100 | 100 | 100 | 100 | 100 | 100 | 100 |
| (B) Novolac type epoxy resin represented by general formula (1) (X = (2)) | B-1 | parts by weight | 0.4 | 0.8 | 1.5 | 1.5 | 1.5 | 1.5 | 1.5 |
| (B) Novolac type epoxy resin represented by general formula (1) (X = (3)) | B-2 | parts by weight | — | — | — | — | — | — | — |
| (C) Bisphenol-A epoxy having an epoxy equivalent of 192 g/eq | C-1 | parts by weight | — | — | — | 2 | — | — | — |
| (C) Bisphenol-A epoxy having an epoxy equivalent of 630 g/eq | C-2 | parts by weight | — | — | — | — | 2 | — | — |
| (C) Bisphenol-A epoxy having an epoxy equivalent of 906 g/eq | C-3 | parts by weight | 2 | 2 | 0.5 | — | — | 2 | — |
| (C) Bisphenol-A epoxy having an epoxy equivalent of 1891 g/eq | C-4 | parts by weight | — | — | — | — | — | — | 2 |
| (C) Bisphenol-A epoxy having an epoxy equivalent of 7989 g/eq | C-5 | parts by weight | — | — | — | — | — | — | — |
| (C) Diglycidyl o-phthalate having an epoxy equivalent of 165 g/eq | C-6 | parts by weight | — | — | — | — | — | — | — |
| Compounded amount of epoxy group derived from (B)/Compounded amount of carboxyl group derived from (A) | — | — | 0.5 | 1 | 2 | 2 | 2 | 2 | 2 |
| Compounded amount of (C) component/Compounded amount of (B) component | — | — | 5.0 | 2.5 | 0.3 | 1.3 | 1.3 | 1.3 | 1.3 |
| Mechanical properties (tensile strength) |  | MPa | 60 | 60 | 60 | 53 | 58 | 60 | 58 |
| Mechanical properties (tensile elongation) |  | % | 6.8 | 6.7 | 6.8 | 5.6 | 6.1 | 6.7 | 6.3 |
| Heat resistance (heat distortion temperature) |  | ° C. | 56 | 55 | 56 | 51 | 53 | 55 | 54 |
| Long-term hydrolysis resistance (tensile strength retention), 96 hours treatment |  | % | 51 | 61 | 57 | 81 | 83 | 84 | 79 |
| Melt stability (change rate of melt flow index), 250° C. |  | % | 21 | 25 | 32 | 20 | 18 | 17 | 24 |
| Melt stability (change rate of melt flow index), 270° C. |  | % | 28 | 31 | 48 | 41 | 33 | 30 | 37 |
| Color tone (yellow index (YI)) |  | — | 24 | 25 | 34 | 32 | 31 | 31 | 31 |
| Concentration of carboxyl groups (concentration of carboxyl groups in resin components in the resin composition) |  | eq/t | 12 | 11 | 11 | 9 | 9 | 8 | 10 |
| Concentration of epoxy groups |  | eq/t | 25 | 40 | 51 | 147 | 75 | 64 | 55 |
| Chemical resistance (tensile strength retention) |  | % | 41 | 55 | 42 | 45 | 61 | 72 | 70 |
| Oxidative degradation resistance (increase rate of concentration of carboxyl groups), 270° C. × 15 minutes treatment |  | % | 118 | 110 | 118 | 115 | 112 | 107 | 111 |
| Bleed-out |  | visual observation | A | A | A | A | A | A | A |

TABLE 2

|  | Sign | Unit | \multicolumn{8}{c}{Examples} |
|---|---|---|---|---|---|---|---|---|---|---|
|  |  |  | 8 | 9 | 10 | 11 | 12 | 13 | 14 | 15 |
| (A) Thermoplastic polyester resin | A-1 | parts by weight | 100 | 100 | 100 | 100 | 100 | 100 | 100 | — |
| (A) Thermoplastic polyester resin | A-2 | parts by weight | — | — | — | — | — | — | — | 100 |
| (B) Novolac type epoxy resin represented by general formula (1) (X = (2)) | B-1 | parts by weight | 1.5 | 1.5 | 1.5 | 1.5 | — | 3 | 4.5 | 2.0 |
| (B) Novolac type epoxy resin represented by general formula (1) (X = (3)) | B-2 | parts by weight | — | — | — | — | 1.7 | — | — | — |
| (C) Bisphenol-A epoxy having an epoxy equivalent of 192 g/eq | C-1 | parts by weight | — | — | — | — | — | — | — | — |
| (C) Bisphenol-A epoxy having an epoxy equivalent of 630 g/eq | C-2 | parts by weight | — | — | — | — | — | — | — | — |
| (C) Bisphenol-A epoxy having an epoxy equivalent of 906 g/eq | C-3 | parts by weight | — | — | 4 | 7 | 2 | 2 | 2 | 2 |
| (C) Bisphenol-A epoxy having an epoxy equivalent of 1891 g/eq | C-4 | parts by weight | — | — | — | — | — | — | — | — |
| (C) Bisphenol-A epoxy having an epoxy equivalent of 7989 g/eq | C-5 | parts by weight | 2 | — | — | — | — | — | — | — |
| (C) Diglycidyl o-phthalate having an epoxy equivalent of 165 g/eq | C-6 | parts by weight | — | 2 | — | — | — | — | — | — |
| Compounded amount of epoxy group derived from (B)/Compounded amount of carboxyl group derived from (A) | — | — | 2 | 2 | 2 | 2 | 2 | 4 | 6 | 2 |
| Compounded amount of (C) component/Compounded amount of (B) component | — | — | 1.3 | 1.3 | 2.7 | 4.7 | 1.2 | 0.7 | 0.4 | 1.0 |
| Mechanical properties (tensile strength) |  | MPa | 58 | 54 | 53 | 50 | 58 | 55 | 53 | 51 |
| Mechanical properties (tensile elongation) |  | % | 5.9 | 5.5 | 5.4 | 4.7 | 6.3 | 6.0 | 5.9 | 5.6 |
| Heat resistance (heat distortion temperature) |  | ° C. | 52 | 50 | 51 | 48 | 54 | 53 | 51 | 61 |
| Long-term hydrolysis resistance (tensile strength retention), 96 hours treatment |  | % | 68 | 80 | 81 | 75 | 78 | 82 | 83 | 65 |
| Melt residence stability (change rate of melt flow index), 250° C. |  | % | 29 | 23 | 22 | 26 | 24 | 21 | 34 | 26 |
| Melt residence stability (change rate of melt flow index), 270° C. |  | % | 48 | 40 | 36 | 42 | 43 | 35 | 49 | 37 |
| Color tone (yellow index (YI)) |  | — | 33 | 36 | 31 | 31 | 30 | 38 | 41 | 33 |
| Concentration of carboxyl groups (concentration of carboxyl groups in resin components in the resin composition) |  | eq/t | 11 | 10 | 8 | 6 | 9 | 7 | 5 | 22 |
| Concentration of epoxy groups |  | eq/t | 48 | 166 | 86 | 118 | 65 | 123 | 180 | 84 |
| Chemical resistance (tensile strength retention) |  | % | 69 | 36 | 75 | 63 | 67 | 71 | 66 | 63 |
| Oxidative degradation resistance (increase rate of concentration of carboxyl groups), 270° C. × 15 minutes treatment |  | % | 113 | 115 | 102 | 98 | 109 | 103 | 101 | 135 |
| Bleed-out |  | visual observation | A | A | A | A | A | A | A | A |

TABLE 3

|  | Sign | Unit | Examples 16 | 17 | 18 | 19 | 20 | 21 | 22 | 23 | 24 |
|---|---|---|---|---|---|---|---|---|---|---|---|
| (A) Thermoplastic polyester resin | A-1 | parts by weight | 100 | 100 | 100 | 100 | 100 | 100 | 100 | 100 | 100 |
| (B) Novolac type epoxy resin represented by general formula (1) (X = (2)) | B-1 | parts by weight | 1.5 | 1.5 | 1.5 | 1.5 | 1.5 | 1.5 | 1.5 | 1.5 | 1.5 |
| (C) Bisphenol-A epoxy having an epoxy equivalent of 906 g/eq | C-3 | parts by weight | 2 | 2 | 2 | 2 | 2 | 2 | 2 | 2 | 2 |
| (D) Sodium hypophosphite | D-1 | parts by weight | 0.02 | 0.05 | 0.1 | — | — | 0.3 | 0.5 | 0.8 | 1.2 |
| (D) Disodium phosphite | D-2 | parts by weight | — | — | — | 0.1 | — | — | — | — | — |
| (D) Diphenyl hydrogen phosphite | D-3 | parts by weight | — | — | — | — | 0.1 | — | — | — | — |
| Compounded amount of epoxy groups derived from (B)/Compounded amount of carboxyl group derived from (A) | — | | 2 | 2 | 2 | 2 | 2 | 2 | 2 | 2 | 2 |
| Compounded amount of (C) component/Compounded amount of (B) component | — | | 1.3 | 1.3 | 1.3 | 1.3 | 1.3 | 1.3 | 1.3 | 1.3 | 1.3 |
| Mechanical properties (tensile strength) | | MPa | 61 | 60 | 59 | 58 | 59 | 59 | 58 | 52 | 49 |
| Mechanical properties (tensile elongation) | | % | 6.5 | 6.6 | 6.5 | 6.3 | 6.3 | 6.0 | 5.7 | 5.2 | 4.9 |
| Heat resistance (heat distortion temperature) | | °C. | 56 | 56 | 55 | 54 | 54 | 52 | 51 | 50 | 50 |
| Long-term hydrolysis resistance (tensile strength retention), 96 hours treatment | | % | 84 | 84 | 88 | 85 | 78 | 81 | 80 | 78 | 75 |
| Melt residence stability (change rate of melt flow index), 250° C. | | % | 16 | 16 | 15 | 17 | 22 | 15 | 13 | 12 | 13 |
| Melt residence stability (change rate of melt flow index), 270° C. | | % | 29 | 27 | 22 | 24 | 45 | 25 | 23 | 23 | 25 |
| Color tone (yellow index (YI)) | | — | 26 | 24 | 24 | 28 | 30 | 20 | 19 | 19 | 20 |
| Concentration of carboxyl groups (concentration of carboxyl group in resin components in the resin composition) | | eq/t | 8 | 8 | 8 | 8 | 8 | 8 | 8 | 8 | 8 |
| Concentration of epoxy groups | | eq/t | 65 | 66 | 69 | 68 | 67 | 68 | 68 | 66 | 64 |
| Chemical resistance (tensile strength retention) | | % | 74 | 74 | 74 | 72 | 71 | 73 | 70 | 68 | 65 |
| Oxidative degradation resistance (increase rate of concentration of carboxyl groups), 270° C. × 15 minutes treatment | | % | 75 | 44 | 28 | 38 | 57 | 31 | 45 | 59 | 71 |
| Bleed-out | | visual observation | A | A | A | A | A | A | A | A | B |

TABLE 4

|  | Sign | Unit | Examples 25 | 26 | 27 | 28 | 29 | 30 | 31 |
|---|---|---|---|---|---|---|---|---|---|
| (A) Thermoplastic polyester resin | A-1 | parts by weight | 100 | 100 | 100 | 100 | 100 | 100 | 100 |
| (B) Novolac type epoxy resin represented by general formula (1) (X = (2)) | B-1 | parts by weight | 1.5 | 1.5 | 1.5 | 1.5 | 1.5 | 1.5 | 1.5 |
| (C) Bisphenol-A epoxy having an epoxy equivalent of 906 g/eq | C-3 | parts by weight | 2 | 2 | 2 | 2 | 2 | 2 | 2 |
| (E) Phosphoric stabilizer | E-1 | parts by weight | 0.05 | 0.1 | — | 0.3 | 0.1 | 0.1 | 0.1 |
| (E) Phosphoric stabilizer | E-2 | parts by weight | — | — | 0.1 | — | — | — | — |
| (F) Glass fiber | F-1 | parts by weight | — | — | — | — | — | — | — |
| (F) Glass fiber | F-2 | parts by weight | — | — | — | — | — | — | — |
| (G) Reaction accelerator | G-1 | parts by weight | — | — | — | — | 0.030 | — | — |
| (G) Reaction accelerator | G-2 | parts by weight | — | — | — | — | — | 0.030 | — |
| (G) Reaction accelerator | G-3 | parts by weight | — | — | — | — | — | — | 0.030 |
| (H) Olefin resin | H-1 | parts by weight | — | — | — | — | — | — | — |
| Compounded amount of epoxy groups derived from (B)/Compounded amount of carboxyl groups derived from (A) | | — | 2 | 2 | 2 | 2 | 2 | 2 | 2 |
| Compounded amount of (C) component/Compounded amount of (B) component | | — | 1.3 | 1.3 | 1.3 | 1.3 | 1.3 | 1.3 | 1.3 |
| Compounded concentration of (G) reaction accelerator/concentration of epoxy group | | — | — | — | — | — | 0.024 | 0.033 | 0.009 |
| Mechanical properties (tensile strength) | | MPa | 60 | 61 | 61 | 60 | 58 | 57 | 59 |
| Mechanical properties (tensile elongation) | | % | 6.7 | 6.8 | 6.8 | 6.5 | 7.2 | 7.0 | 7.3 |
| Heat resistance (heat distortion temperature) | | °C. | 56 | 57 | 57 | 56 | 60 | 62 | 63 |
| Long-term hydrolysis resistance (tensile strength retention), 96 hours treatment | | % | 84 | 83 | 82 | 79 | 100 | 100 | 100 |
| Long-term hydrolysis resistance (tensile strength retention), 192 hours treatment | | % | — | — | — | — | 93 | 89 | 91 |
| Melt residence stability (change rate of melt flow index), 250° C. | | % | 15 | 10 | 11 | 10 | 24 | 31 | 18 |
| Melt residence stability (change rate of melt flow index), 270° C. | | % | 22 | 17 | 18 | 15 | 40 | 48 | 25 |
| Color tone (yellow index (YI)) | | — | 29 | 26 | 27 | 22 | 53 | 45 | 27 |
| Concentration of carboxyl groups (concentration of carboxyl group in resin components in the resin composition) | | eq/t | 8 | 8 | 9 | 10 | 3 | 6 | 3 |
| Concentration of epoxy groups | | eq/t | 64 | 63 | 63 | 63 | 59 | 62 | 59 |
| Chemical resistance (tensile strength retention) | | % | 73 | 75 | 76 | 74 | 81 | 79 | 82 |
| Oxidative degradation resistance (increase rate of concentration of carboxyl groups), 270 × C. × 15 minutes treatment | | % | 101 | 97 | 98 | 93 | 96 | 95 | 92 |
| Bleed-out | | visual observation | A | A | A | A | A | A | A |

TABLE 5

| | Sign | Unit | \multicolumn{11}{c|}{Examples} |
| --- | --- | --- | --- | --- | --- | --- | --- | --- | --- | --- | --- | --- | --- |
| | | | 32 | 33 | 34 | 35 | 36 | 37 | 38 | 39 | 40 | 41 | 42 |
| (A) Thermoplastic polyester resin | A-1 | parts by weight | 100 | 100 | 100 | 100 | 100 | 100 | 100 | 100 | 100 | 100 | 100 |
| (B) Novolac type epoxy resin represented by general formula (1) (X = (2)) | B-1 | parts by weight | 1.5 | 1.5 | 1.5 | 1.5 | 1.5 | 1.5 | 1.5 | 1.5 | 1.5 | 1.5 | 1.5 |
| (C) Bisphenol-A epoxy having an epoxy equivalent of 906 g/eq | C-3 | parts by weight | 2 | 2 | 2 | 2 | 2 | 2 | 2 | 2 | 2 | 2 | 2 |
| (D) Sodium hypophosphite | D-1 | parts by weight | 0.1 | 0.1 | — | — | — | — | — | — | — | — | — |
| (D) Disodium phosphite | D-2 | parts by weight | — | — | — | — | — | — | — | — | — | — | — |
| (E) Phosphoric stabilizer | E-1 | parts by weight | — | — | 0.1 | 0.1 | 0.1 | — | — | — | — | — | — |
| (E) Phosphoric stabilizer | E-2 | parts by weight | — | — | — | — | — | — | — | — | — | — | — |
| (F) Glass fiber | F-1 | parts by weight | — | — | — | — | — | 20 | 20 | 20 | 40 | 40 | 40 |
| (F) Glass fiber | F-2 | parts by weight | — | — | — | — | — | — | — | — | — | — | — |
| (G) Reaction accelerator | G-1 | parts by weight | 0.030 | — | — | — | — | — | — | — | — | — | — |
| (G) Reaction accelerator | G-2 | parts by weight | — | 0.030 | 0.060 | 0.080 | 0.100 | — | — | — | — | — | — |
| (G) Reaction accelerator | G-3 | parts by weight | — | — | — | — | — | — | — | — | — | — | — |
| (H) Olefin resin | H-1 | parts by weight | — | — | — | — | — | — | — | 10 | — | — | 10 |
| Compounded amount of epoxy groups derived from (B)/Compounded amount of carboxyl group derived from (A) | | | 2 | 2 | 2 | 2 | 2 | 2 | 2 | 2 | 2 | 2 | 2 |
| Compounded amount of (C) component/Compounded amount of (B) component | | | 1.3 | 1.3 | 1.3 | 1.3 | 1.3 | 1.3 | 1.3 | 1.3 | 1.3 | 1.3 | 1.3 |
| Compounded concentration of (G) reaction accelerator/Concentration of epoxy groups | | | 0.033 | 0.009 | 0.017 | 0.023 | 0.029 | — | — | — | — | — | — |
| Mechanical properties (tensile strength) | | MPa | 57 | 59 | 59 | 57 | 55 | 105 | 108 | 90 | 149 | 151 | 138 |
| Mechanical properties (tensile elongation) | | % | 6.9 | 7.2 | 7.5 | 7.4 | 7.2 | 4.6 | 4.8 | 5.3 | 3.8 | 3.7 | 4.2 |
| Heat resistance (heat distortion temperature) | | ° C. | 61 | 62 | 65 | 63 | 61 | 197 | 195 | 193 | 208 | 211 | 207 |
| Long-term hydrolysis resistance (tensile strength retention), 96 hours treatment | | % | 100 | 100 | 100 | 100 | 100 | 84 | 92 | 93 | 90 | 95 | 95 |
| Long-term hydrolysis resistance (tensile strength retention), 192 hours treatment | | % | 88 | 90 | 96 | 94 | 93 | 51 | 60 | 67 | 71 | 88 | 93 |
| Melt residence stability (change rate of melt flow index), 250° C. | | % | 30 | 17 | 19 | 24 | 34 | 27 | 23 | 20 | 22 | 21 | 21 |
| Melt residence stability (change rate of melt flow index), 270° C. | | % | 47 | 23 | 27 | 31 | 45 | 34 | 32 | 28 | 31 | 29 | 29 |
| Color tone (yellow index (YI)) | | | 41 | 24 | 28 | 28 | 29 | 30 | 31 | 27 | 32 | 33 | 25 |
| Concentration of carboxyl groups (concentration of carboxyl groups in resin components in the resin composition) | | eq/t | 6 | 3 | 2 | 1 | 1 | 9 | 12 | 8 | 11 | 13 | 10 |
| Concentration of epoxy groups | | eq/t | 62 | 59 | 58 | 57 | 57 | 63 | 61 | 63 | 62 | 58 | 61 |
| Chemical resistance (tensile strength retention) | | % | 79 | 82 | 87 | 83 | 81 | 75 | 81 | 85 | 80 | 85 | 88 |
| Oxidative degradation resistance (increase rate of concentration of carboxyl groups), 270° C. × 15 minutes treatment | | % | 27 | 24 | 98 | 97 | 87 | 106 | 102 | 97 | 102 | 99 | 94 |
| Bleed-out | | visual observation | A | A | A | A | A | A | A | A | A | A | A |

TABLE 6

|  | Sign | Unit | Comparative Examples | | | | |
|---|---|---|---|---|---|---|---|
|  |  |  | 1 | 2 | 3 | 4 | 5 |
| (A) Thermoplastic polyester resin | A-1 | parts by weight | 100 | 100 | 100 | 100 | 100 |
| (B) Novolac type epoxy resin represented by general formula (1) (X = (2)) | B-1 | parts by weight | 1.5 | — | 1.5 | 6 | — |
| (B')Novolac type epoxy resin represented by general formula (8) | B'-1 | parts by weight | — | — | — | — | 1.3 |
| (C) Bisphenol-A epoxy having an epoxy equivalent of 906 g/eq | C-3 | parts by weight | — | 2 | 12 | 2 | 2 |
| Compounded amount of epoxy group derived from (B) or (B')/Compounded amount of carboxyl group derived from (A) | — | — | 2 | 0 | 2 | 8 | 2 |
| Compounded amount of (C) component/Compounded amount of (B) component | — | — | — | — | 8 | 0.3 | — |
| Mechanical properties (tensile strength) |  | MPa | 58 | 55 | 43 | 50 | 52 |
| Mechanical properties (tensile elongation) |  | % | 4.9 | 5.3 | 3.3 | 5.3 | 3.1 |
| Heat resistance (heat distortion temperature) |  | ° C. | 56 | 54 | 39 | 48 | 46 |
| Long-term hydrolysis resistance (tensile strength retention), 96 hours treatment |  | % | 55 | 21 | 74 | 84 | 40 |
| Melt residence stability (change rate of melt flow index), 250° C. |  | % | 36 | 20 | 31 | 35 | 90 |
| Melt residence stability (change rate of melt flow index), 270° C. |  | % | 70 | 30 | 138 | 81 | 259 |
| Color tone (yellow index (YI)) |  | — | 35 | 23 | 31 | 49 | 39 |
| concentration of carboxyl group (concentration of carboxyl groups in resin components in the resin composition) |  | eq/t | 13 | 17 | 5 | 4 | 14 |
| concentration of epoxy groups |  | eq/t | 55 | 20 | 173 | 251 | 82 |
| Chemical resistance (tensile strength retention) |  | % | 15 | 28 | 56 | 60 | 34 |
| Oxidative degradation resistance (increase rate of concentration of carboxyl groups), 270° C. × 15 minutes treatment |  | % | 123 | 153 | 118 | 110 | 105 |
| Bleed-out |  | visual observation | A | A | A | A | A |

From a comparison between Examples 1 to 3, 6, 10 to 11, and 13 to 14 and Comparative Examples 1 to 4, it can be seen that the compounded amount of (B) the component and the compounded amount of (C) the component each in a specific range afforded materials having an excellent balance among hydrolysis resistance, chemical resistance, and melt stability at 270° C. In addition, the materials having a ratio of the compounded amount of (C) the component/the compounded amount of (B) the component in a range of 0.5 to 4 were ones which had particularly an excellent balance between long-term hydrolysis resistance and melt stability at 270° C.

From a comparison between Examples 5 and 12 and Comparative Examples 5, it can be seen that using (B) the novolac type epoxy resin represented by general formula (1) afforded excellent hydrolysis resistance while maintaining melt residence stability.

From a comparison between Examples 2 to 3, 6, 10 to 11 and 13 and Comparative Examples 1 and 14, it can be seen that the materials having a concentration of epoxy groups in the thermoplastic polyester resin composition in a range of 30 to 150 eq/t were ones which particularly had an excellent balance between long-term hydrolysis resistance and melt stability at 270° C.

From a comparison between Examples 2 and 6 and Example 15, it can be seen that the materials having a concentration of carboxyl groups of 20 eq/t or less had excellent long-term hydrolysis resistance in particular, the concentration including: the concentration of carboxyl groups derived from (A) the thermoplastic polyester resin; the concentration of carboxyl groups derived from the reactant of (A) the thermoplastic polyester resin and (B) the novolac type epoxy resin represented by the general formula (1); and the concentration of carboxyl groups derived from the reactant of (A) the thermoplastic polyester resin and (C) the epoxy compound in which the number of epoxy functional groups per molecule is two; with respect to the total amount of (A) the thermoplastic polyester resin, the reactant of (A) the thermoplastic polyester resin and (B) the novolac type epoxy resin represented by the general formula (1), and the reactant of (A) the thermoplastic polyester resin and (C) the epoxy compound in which the number of epoxy functional groups per molecule is two in the thermoplastic polyester resin composition.

From a comparison between Examples 5 to 7 and Examples 4 and 8, it can be seen that using (C) the bisphenol-A type epoxy resin afforded materials having excellent hydrolysis resistance and chemical resistance. In addition, using (C) the bisphenol-A type epoxy resin having an epoxy value of 300 to 3000 g/eq afforded materials particularly having excellent long-term hydrolysis resistance and chemical resistance while maintaining melt stability at 270° C.

From a comparison between Examples 16 to 19 and Examples 6 and 23, it can be seen that containing (D) 0.01 to 1 part by weight of the reducing phosphorus compound afforded materials having superior oxidative degradation resistance and color tone.

From a comparison between Examples 18 and 19 and Example 20, it can be seen that using a metal phosphite or a metal hypophosphite as (D) the component afforded materials having a superior balance between mechanical strength and each of heat resistance, long-term hydrolysis resistance, and oxidative degradation resistance.

From a comparison between Example 6 and Example 15, it can be seen that using a polybutylene terephthalate resin as (A) the component afforded materials having an excellent balance between mechanical strength and long-term hydrolysis resistance.

From a comparison between Examples 25 to 28 and Example 6, it can be seen that containing (E) 0.01 to 1 part by weight of the phosphorus-containing stabilizer afforded materials having superior melt stability at 270° C. and color tone.

From a comparison between Examples 37, 38, 40, and 41 and Example 6, it can be seen that further containing (F) the fibrous reinforcing filler afforded materials having a superior balance between mechanical strength and each of heat resistance, long-term hydrolysis resistance, and chemical resistance.

From a comparison between Examples 38 and 41 and Examples 37 and 40, it can be seen that using, as (F) the fibrous reinforcing filler, the glass fiber treated with a sizing agent containing a copolymer including a maleic anhydride afforded materials having a superior balance between mechanical strength and each of heat resistance, long-term hydrolysis resistance, and chemical resistance.

From a comparison between Examples 29 to 36 and Example 26, it can be seen that containing (G) 0.001 to 1 part by weight of the reaction accelerator afforded materials having a superior balance between mechanical properties and each of long-term hydrolysis resistance and chemical resistance.

From a comparison between Examples 31 and 33 to 36 and Examples 29 and 30, it can be seen that using an organic phosphine and a salt thereof as (G) the component afforded materials having a superior balance between long-term hydrolysis resistance and each of melt stability at 270° C. and color tone.

From a comparison between Examples 39 and 42 and Examples 38 and 41, it can be seen that the further containing an olefin resin as (H) another additive afforded materials having a superior balance between toughness and each of heat resistance, long-term hydrolysis resistance, and color tone.

The invention claimed is:

1. A thermoplastic polyester resin composition obtained by compounding a mixture comprising (A) 100 parts by weight of a thermoplastic polyester resin, (B) 0.05 to 5 parts by weight of a novolac type epoxy resin represented by general formula (1), (C) 0.05 to 10 parts by weight of an epoxy compound in which number of epoxy functional groups per molecule is two, and (D) 0.01 to 1 parts by weight of a sodium hypophosphite:

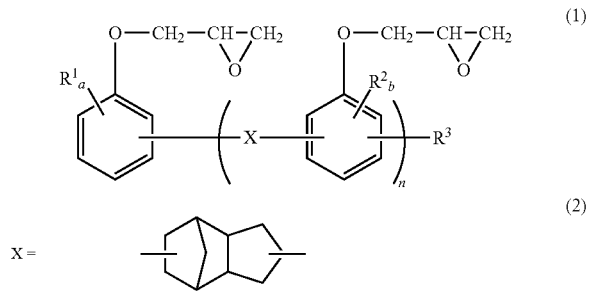

wherein, in the general formula (1), X represents a bivalent group represented by general formula (2); in the general formulae (1), $R^1$ and $R^2$ independently represent C1-C8 alkyl, or C6-C10 aryl and may be the same or different; $R^3$ represents a hydrogen atom, C1-C8 alkyl or C6-C10 aryl; in the general formula (1), n represents a value of 2 or more and equal to or smaller than 10; and, in general formula (1), a independently represents an integer from 0 to 4, and b represents an integer from 0 to 3, wherein (A) the thermoplastic polyester resin is at least one selected from the group consisting of polybutylene terephthalate, polypropylene terephthalate, and polybutylene naphthalate, and (C) the epoxy compound in which the number of epoxy functional groups per molecule is two, is a bisphenol-A type epoxy resin having an epoxy value of 906 to 3000 g/eq, the ratio of the amount of epoxy group (eq/g) of (B) the novolac type epoxy resin represented by the general formula (1) contained in the mixture prior to compounding to the amount of carboxyl end group (eq/g) of (A) the thermoplastic polyester resin contained in the mixture prior to compounding is 2 or more and 7 or less, and the compounded amount ratio of the compounded amount of (C) the epoxy compound in which the number of epoxy functional groups per molecule is two to the compounded amount of (B) the novolac type epoxy resin represented by the general formula (1) is 0.5 to 4, wherein a tensile strength retention measured with respect to a ⅛ inches (about 3.2 mm) of a test piece molded in conformity with ASTM D638 (2005) and determined according to equation (1) is more than 70% and less than 82%

The tensile strength retention (%)=(a maximum tensile strength point of the molded article treated in grease at 130° C./a maximum tensile strength point of the untreated molded article)×100  Equation (1):

wherein, conditions of treatment in grease at 130° C. is that test pieces are loaded into an oil bath with the bath set to a temperature of 130° C. and filled with a grease comprising mineral oil and lithium hydroxystearate, and treated for 500 hours.

2. The thermoplastic polyester resin composition according to claim 1, wherein a concentration of epoxy group is 30 to 150 eq/t.

3. The thermoplastic polyester resin composition according to claim 1, wherein the concentration of carboxyl group is less than 20 eq/t.

4. The thermoplastic polyester resin composition according to claim 1, wherein (A) the thermoplastic polyester resin is polybutylene terephthalate.

5. The thermoplastic polyester resin composition according to claim 1, further comprising (E) 0.01 to 1 part by weight of a phosphoric stabilizer with respect to (A) 100 parts by weight of the thermoplastic polyester resin.

6. The thermoplastic polyester resin composition according to claim 1, further comprising (F) 1 to 100 parts by weight of a fibrous reinforcing filler with respect to (A) 100 parts by weight of the thermoplastic polyester resin.

7. The thermoplastic polyester resin composition according to claim 1, further comprising (G) 0.001 to 1 part by weight of a reaction accelerator with respect to (A) 100 parts by weight of the thermoplastic polyester resin.

8. A molded article melt-molded from the thermoplastic polyester resin composition according to claim 1.

* * * * *